US009898082B1

(12) United States Patent
Greenwald

(10) Patent No.: US 9,898,082 B1
(45) Date of Patent: Feb. 20, 2018

(54) METHODS AND APPARATUS FOR EYE TRACKING

(71) Applicant: Massachusetts Institute of Technology, Cambridge, MA (US)

(72) Inventor: Scott Greenwald, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/340,977

(22) Filed: Nov. 1, 2016

(51) Int. Cl.
G06F 3/01 (2006.01)
G06T 7/00 (2017.01)
G06K 9/00 (2006.01)

(52) U.S. Cl.
CPC ......... G06F 3/013 (2013.01); G06K 9/00604 (2013.01); G06T 7/0044 (2013.01); G06T 2207/20081 (2013.01); G06T 2207/30201 (2013.01)

(58) Field of Classification Search
CPC ... G06F 3/013; G06K 9/00604; G06T 7/0044; G06T 2207/20081; G06T 2207/30201; A61B 3/0091
See application file for complete search history.

(56) References Cited

U.S. PATENT DOCUMENTS

| 6,134,339 A | 10/2000 | Luo |
| 6,659,611 B2 | 12/2003 | Amir et al. |
| 7,391,887 B2 | 6/2008 | Durnell |
| 7,809,160 B2 | 10/2010 | Vertegaal et al. |
| 2011/0182472 A1 | 7/2011 | Hansen |
| 2011/0279666 A1 | 11/2011 | Strombom et al. |
| 2013/0002846 A1 | 1/2013 | De Bruijn et al. |
| 2013/0188834 A1* | 7/2013 | Ebisawa ................ A61B 3/113 382/103 |
| 2013/0329957 A1* | 12/2013 | Ebisawa ................ A61B 3/113 382/103 |
| 2014/0098198 A1* | 4/2014 | Lee .................... H04N 13/0246 348/48 |
| 2015/0042558 A1* | 2/2015 | Massonneau ........... G06F 3/005 345/156 |

(Continued)

OTHER PUBLICATIONS

Chen, J., et al., 3D Gaze Estimation with a Single Camera without IR Illumination, published in 19th International Conference on Pattern Recognition, 2008, ICPR 2008, IEEE.

(Continued)

Primary Examiner — Tom Sheng
(74) Attorney, Agent, or Firm — Stephen R. Otis

(57) ABSTRACT

A gaze tracking system uses visible light to track the pose of an eye. A display screen displays a display image, while a camera captures images of the eye. The images captured by the camera include a reflection of the display screen, reflecting from the cornea of the eye. The position of the reflection depends on the orientation of the eye. The system is trained on a set of training images. Each training image is captured by the camera while the eye looks at a different, known gaze point in the display screen. The system may track gaze of the eye, while the eye is looking at a calibrated image that has been displayed during training. Or the system may track gaze of an eye looking at a new, uncalibrated image, such as an image in a video.

20 Claims, 15 Drawing Sheets

(56) References Cited

U.S. PATENT DOCUMENTS

| | | | | |
|---|---|---|---|---|
| 2015/0160725 | A1* | 6/2015 | Lee | G06F 3/013 348/78 |
| 2015/0338914 | A1* | 11/2015 | Andrysco | G06F 3/041 345/173 |
| 2016/0011657 | A1* | 1/2016 | Estacio | G06F 3/013 345/156 |
| 2016/0063303 | A1* | 3/2016 | Cheung | A61B 3/113 382/103 |
| 2016/0216761 | A1* | 7/2016 | Klingstrom | B60K 37/06 |
| 2017/0293794 | A1* | 10/2017 | Tsurumi | G06K 9/0061 |

OTHER PUBLICATIONS

Chennamma, H., et al., A Survey on Eye-Gaze Tracking Techniques, published in Indian Journal of Computer Science and Engineering, vol. 4, No. 5, Oct.-Nov. 2013, pp. 388-393.

Coutinho, F., et al., Improving Head Movement Tolerance of Cross-Ratio Based Eye Trackers, published in International Journal of Computer Vision, Feb. 2013, vol. 101, Issue 3, pp. 459-481.

Hammer, J., et al., Real-Time 3D Gaze Analysis in Mobile Applications, published in Proceedings of the 2013 Conference on Eye Tracking South Africa, ETSA '13, pp. 75-78.

Kriegman, D., Homography Estimation, 2007, Univ. of California, San Diego.

Lee, J., A Novel Gaze Tracking Method Based on the Generation of Virtual Calibration Points, published in Sensors 2013, 13(8), 10802-10822.

Lu, F., et al., A Head Pose-Free Approach for Appearance-based Gaze Estimation, Published in Proceedings of the British Machine Vision Conference, pp. 126.1-126.11, BMVA Press, Sep. 2011.

Nakazawa, A., et al., Point of Gaze Estimation Through Corneal Surface Reflection in an Active Illumination Environment, published in Computer Vision—ECCV 2012, vol. 7573 of the series Lecture Notes in Computer Science pp. 159-172.

Nitschke, C., et al., Image-based Eye Pose and Reflection Analysis for Advance Interaction Techniques and Scene Understanding, published in IPSJ SIG Technical Report, Information Processing Society of Japan, 2011.

Nitschke, C., et al., Display-camera calibration using eye reflections, and geometry constraints, published in Computer Vision and Image Understanding, vol. 115, Issue 6, Jun. 2011, pp. 835-853.

Orozco, J., et al., Real-time gaze tracking with appearance-based models, published in Machine Vision and Applications, Oct. 2009, vol. 20, Issue 6, pp. 353-364.

Park, J., et al., Gaze Tracking System Using Single Camera and Purkinje Image, published in Proceedings of the 2005 international Conference on Augmented tele-existence, ICAT '05, pp. 280-280 (2005).

Philbin, J., et al., Object retrieval with large vocabularies and fast spatial matching, published in IEEE Conference onComputer Vision and Pattern Recognition, 2007, CVPR '07.

Rikert, T., et al., Gaze estimation using morphable models, published in Proceedings of Third IEEE International Conference on Automatic Face and Gesture Recognition, 1998.

Schnieders, D., et al., Reconstruction of Display and Eyes from a Single Image, published in 2010 IEEE Conference on Computer Vision and Pattern Recognition (CVPR), 2010.

Shimizu, J., et al., Eye Movement Interactions in Google Cardboard using a Low Cost EOG Setup, published in Proceedings of the 2016 ACM International Joint Conference on Pervasive and Ubiquitous Computing: Adjunct, UbiComp '16, pp. 1773-1776, Heidelberg, Germany—Sep. 12-16, 2016, ACM New York, NY, USA.

Sivic, J., et al., Video Google: A Text Retrieval Approach to Object Matching in Videos, published in Proceedings, Ninth IEEE International Conference on Computer Vision, 2003.

Sugano, Y., et al., Appearance-Based Gaze Estimation Using Visual Saliency, published in IEEE Transactions on Pattern Analysis and Machine Intelligence, vol. 35, Issue 2, Feb. 2013.

Tan, K., et al., Appearance-based eye gaze estimation, published in Proceedings, Sixth IEEE Workshop on Applications of Computer Vision, 2002 (WACV 2002).

* cited by examiner

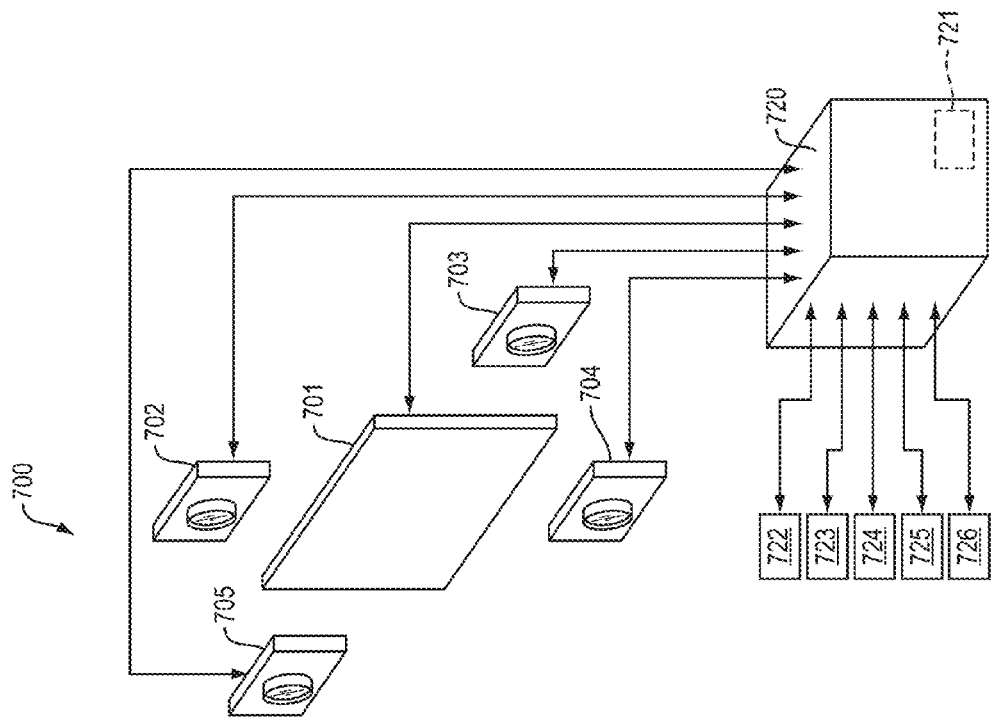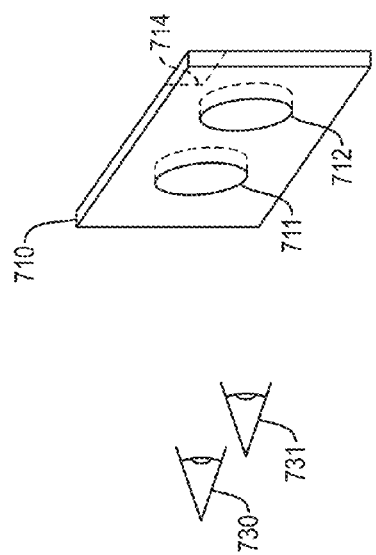
FIG. 7

METHODS AND APPARATUS FOR EYE TRACKING

FIELD OF TECHNOLOGY

The present invention relates generally to eye tracking.

COMPUTER PROGRAM LISTING

Attached are two computer program files, each created as a .txt file on Nov. 1, 2016: (1) layoutFunctions.txt with a size of about 18 KB; and (2) makefunctionsNew.txt with a size of about 48 KB. These two computer program files comprise source code for software employed in a prototype implementation of this invention. These two computer program files are each incorporated by reference herein.

SUMMARY

In illustrative implementations of this invention, a gaze tracking system accurately tracks the pose of a user's eye using visible light. The gaze tracking may be performed in real-time.

In illustrative implementations, this invention—unlike conventional approaches to gaze-tracking—does not require any of the following: (a) an on-axis light source for illuminating the eye; (b) infra-red light; (c) detecting "glint" (i.e., retro-reflection) reflecting from the eye; or (d) detecting the pupil, centroid of pupil, or boundary of the iris or pupil.

In illustrative implementations of this invention, the system tracks gaze while the eye looks at a VR (virtual reality) display, AR (augmented reality) display, or other near-eye display. Alternatively, the system may track eye pose while the eye looks at a computer monitor or other display in the user's environment.

In illustrative implementations, the gaze-tracking system includes a display screen, optics, a camera, and a computer. The display screen displays an image that is visible to a user's eye, while the camera captures one or more images of the eye. These camera images capture a Purkinje image of all or a portion of the display screen, reflecting from the cornea of the eye. The position, orientation and shape of the Purkinje image varies depending on the orientation of the eye. The gaze-tracking system determines the gaze point—that is, the point (in the display screen) at which the eye is looking—based on the Purkinje image and on information acquired during training.

In illustrative implementations, the gaze-tracking system is trained on a set of training images that are captured by a camera while the eye is looking at a display image that is displayed by the display screen. Each training image is captured while the eye looks at a different gaze point in the display screen. Thus: (a) the gaze points differ, from training image to training image; (b) the direction in which the eye is looking differs, from training image to training image; and (c) the position, orientation and shape of the Purkinje image (of the display screen, reflecting from the cornea) that is captured in the training images varies, from training image to training image.

The position of the gaze points in the training images are known. This is because the display image that is displayed during training: (a) is known; and (b) includes either a static grid of fixation targets or a moving fixation target. The user is instructed to look at the fixation target(s) while the training images are captured. If the display image includes a static grid of fixation targets, then the user is instructed to look at a different grid point (fixation target) for each different training image that is captured by the camera. In some cases, the display screen causes the fixation targets to visually pulsate (e.g., by changing color, size or shape) in a sequence, one at a time, to induce the eye to look at the fixation target that is currently pulsating. If the display image includes a single, moving fixation target, then the user is instructed to visually follow the moving fixation target, and the training images are captured by the camera while the eye is looking at different points along the trajectory of the moving fixation target.

In illustrative implementations, the gaze-tracking system tracks gaze of an eye that is looking at either a calibrated image or an uncalibrated image. As used herein, a "calibrated image" means a display image that was previously displayed during training—i.e., a display image on which the system was trained. As used herein, a "new image" or "unknown image" means a display image that was not previously displayed during training—i.e., a display image on which the system has not been trained.

In illustrative implementations of this invention, it is usually more computationally efficient to calculate eye pose when the user is looking at a calibrated image. However, in many use scenarios, it would not be practical to train the system on every image that will be displayed. For example, if the user is watching a video, or playing a computer game, or interacting with a graphical user interface (GUI), it may not be practical to train the system on every frame of the video, computer game or GUI. In such scenarios, the system may track gaze while the user looks at new, unknown display images.

A few definitions are helpful, for the following discussion.

As used herein, a "display image" means an image displayed by a display surface.

As used herein, a "camera image" means an image captured by a camera.

As used herein, a "display gaze point" means a gaze point in a display surface.

As used herein, a "camera gaze point" means a point in a camera image that corresponds to a display gaze point in a display surface (the display gaze point being the point at which an eye is looking when the camera image is captured by a camera).

As used herein, a display gaze point "for" a camera image means the display gaze point at which an eye is looking, when the camera image is captured.

"Gaze point", in the context of an eye, means a point of regard, i.e., a point intersected by the eye's visual axis. Unless the context clearly indicates otherwise, a "gaze point" is a display gaze point.

As used herein, a "training image" means a camera image captured during training.

As used herein, a "training gaze point" means a display gaze point for a camera image captured during training—that is, the display gaze point at which an eye is looking, when the camera image is captured during training.

As used herein, an "image pair" means a pair consisting of a display image and a camera image.

In illustrative implementations, the gaze-tracking includes both training steps and so-called run-time steps that occur after training.

In some implementations, the system performs what is referred to herein as "discrete gaze tracking" in order to estimate the pose of an eye that is looking at a calibrated display image.

In some implementations, discrete gaze tracking is performed as follows: During training, the camera captures training images, each for a different, known gaze point (as described above). Then, during run-time, the camera captures a run-time camera image of a user's eye, while (i) the display screen is displaying the same display image that was displayed during training, (ii) the eye is looking at the display screen, and (iii) a Purkinje image of all or part of the display screen is reflecting off the cornea of the eye. A computer compares visual features in the run-time camera image to visual features in the training images. Based on this comparison, the computer determines which training image is the closest match to the run-time camera. The computer then estimates that the gaze point for the run-time camera image is the same as the gaze point for the closest-matched training image.

The discrete gaze tracking may be performed in such a manner that the output (estimated gaze point for a run-time camera image) is always one of the gaze points for the training images. Thus, the discrete gaze tracking may involve a classification algorithm, in the sense that the computer may assign the run-time camera image to a discrete class in a classification system and may estimate gaze point based on that class. In this classification system, there may be a class for each training image, and the run-time image may be assigned to a given class depending on whether the run-time camera most closely matches the training image for a given class.

In some implementations, the system performs what is referred to herein as "continuous gaze tracking" in order to estimate the pose of an eye that is looking at a calibrated display image. In continuous gaze tracking, the output (estimated gaze point for a run-time camera image) is not limited to the training gaze points. Instead, in continuous gaze tracking, the estimated gaze point for the run-time camera image may be either a training gaze point or may be another point in the display screen, such as a point that is located between training gaze points.

In some implementations, continuous gaze tracking includes both training steps and run-time steps.

For example, the continuous gaze tracking may include the following training steps: During training, the camera may capture training images of an eye, each for a different, known gaze point (as described above). Also, during training, a computer may transform the (x,y) coordinates of the camera gaze points for the training images into global camera-space coordinates, as described in more detail below. Furthermore, during training, a computer may calculate—based on the display images displayed during training, on the training images captured by a camera during training, and on the known gaze points for the training images—a mapping that maps from a display image and its gaze point to a camera image. Thus, if the system knows a display image and the gaze point for that display image, then the mapping tells the system what camera image is captured. The inverse mapping (inverse of the above mapping) maps from a camera image to a display gaze point. Thus, if the system knows a camera image, then the inverse mapping tells the system the display gaze point of the display image that was captured to create the camera image. For example, the inverse mapping may comprise an homography. In illustrative implementations, the inverse mapping is a continuous mapping (as defined herein).

Also, for example, the continuous gaze tracking may include the following run-time steps: During run-time, the camera may capture a run-time camera image of the eye, while the display screen displays the same image that was displayed during training (as described above). A computer may calculate, for each image pair that consists of the run-time camera image and a training image, the normalized geometric offset between the camera gaze point for the run-time image and the camera gaze point for the training image. A computer may calculate, based on the normalized geometric offsets (for all of the image pairs consisting of the run-time camera image and a training image) and on the inverse mapping, an estimate of the display gaze point for the run-time camera image. Because the inverse mapping is continuous, the estimated display point may, for example, be a training gaze point or be a point that is located between training gaze points.

In some implementations, the system employs the gaze of an eye that is looking at a new, uncalibrated display image, such as a video frame. To do so, the system performs a modified version of the continuous gaze tracking described above. In some cases, the tracking for a new, uncalibrated display image may be performed in the manner described in the preceding two paragraphs, but with at least three modifications: (1) During run-time, the display screen may display a new display image (e.g., video frame) that is different than the display image that was displayed during training. (2) A computer may calculate, based on the new run-time display image and on an eye model that has been fitted to the training camera images, simulated camera images. Each simulated image may appear to capture the new, run-time display image reflecting from a cornea of a user's eye, while the eye looks at a training gaze point. Each simulated camera image may simulate a camera image taken while the eye looks at a different training gaze point; collectively, the simulated images may simulate camera images taken while the eye looks at all of the training gaze points, one training gaze point per simulated image. (3) A computer may calculate, for each image pair that consists of the run-time camera image and a simulated image, the normalized geometric offset between the camera gaze point for the run-time image and the camera gaze point for the simulated image. A computer may calculate, based on the normalized geometric offsets (for all of the image pairs consisting of the run-time camera image and a simulated image) and on the inverse mapping, an estimate of the display gaze point for the run-time camera image. Because the inverse mapping is continuous, the estimated display point may, for example, be a training gaze point or be a point that is located between training gaze points.

The preceding discussion of continuous gaze tracking (both for calibrated images and new, uncalibrated images) refers to the normalized geometric offset between camera gaze points for an image pair. For continuous gaze tracking, each image pair may consist of (i) the run-time camera image and (ii) a training image (if the continuous gaze tracking is being performed on a calibrated image) or a simulated image (if the continuous gaze tracking is being performed on a new image). The geometric offset between camera gaze points for such an image pair may be normalized by calculating the magnitude of the difference between such geometric offset and an average offset for that image pair. For each such image pair, the average offset for that image pair may be computed by: (i) selecting the maximal subset of geometrically consistent matching features in the image pair; (ii) for each pair of matching features in this subset, calculating the pairwise geometric offset between this pair of matching features; and (iii) calculating the average of these pairwise geometric offsets.

In continuous gaze tracking (either for calibrated images or new images), a computer estimates the 2D position (i.e., the (x,y) coordinates) of the display gaze point for the run-time camera image. This 2D computation may, optionally, be broken into two separate 1D computations, one for the x coordinate of the display gaze point and the other for the y coordinate of the display gaze point. Each of these 1D computations: (a) calculates the normalized geometric offsets in only one dimension (i.e., along the x-axis or along the y-axis); and (b) calculates the position of the display gaze point in only one dimension (i.e., along the x-axis or along the y-axis).

In illustrative implementations, the gaze-tracking system includes optics. These optics may comprise one or more refractive or reflective optical components that: (a) are positioned between the eye and the display screen; and (b) tend to converge light rays that are traveling from the display screen to the eye. Because the optics converge these light rays, the optics allow the eye to focus on the display screen at a shorter distance from the eye than would occur without the optics—and thus allow the display screen to be placed closer to the eye, which is desirable in many applications (such as gaze-tracking for VR or AR displays)

In some cases, inconsistencies between camera images may arise. Typically, the primary cause of such inconsistencies may be slight shifting (translation) of the display screen or camera relative to the eye between different camera exposures.

In some cases, these inconsistencies are mitigated by transforming x, y coordinates of the camera gaze points for training images into global camera-space coordinates. In some cases, this 2D transformation of the x, y coordinates of the gaze points for training images is broken into two 1D transformations, one for the x coordinates and the other for the y coordinates.

In some cases, each 1D transformation minimizes a sum of normalized pairwise geometric offsets between the camera gaze points of the training images.

This sum (of normalized pairwise geometric offsets between camera gaze points of the training images) may be calculated as follows: For each pair of training images, calculate the pairwise geometric offset between camera gaze points for that pair of training images (i.e., between the camera gaze point of an image in the pair and the camera gaze point of the other image in the pair). Then, for each pair of training images, normalize this geometric offset between camera gaze points by calculating the absolute value of the difference between (i) this geometric offset between the camera gaze points for that pair of images and (ii) an average pairwise geometric offset between matching features in that pair of images. Then add these normalized pairwise geometric offsets (between camera gaze points) for all of the pairs of training images. This results in a sum of normalized pairwise geometric offsets between the camera gaze points of the training images. As noted above, each of the 1D transformations (that is performed to transform coordinates of camera gaze points into global camera-space coordinates) may minimize this sum, in order to reconcile information between different training images and to mitigate erroneous inconsistencies between training images.

The preceding paragraph mentions an average pairwise geometric offset between matching features in a pair of training images. In some cases, this average offset is calculated as follows. For each pair of training images: (a) select the maximal subset of geometrically consistent matching features for that pair of training images; (b) for each pair of matching features in this subset, calculate the pairwise geometric offset between this pair of matching features; and (c) calculate the average of these pairwise geometric offsets.

In some implementations, the above transformation into global coordinate camera-space coordinates occurs during training.

The description of the present invention in the Summary and Abstract sections hereof is just a summary. It is intended only to give a general introduction to some illustrative implementations of this invention. It does not describe all of the details and variations of this invention. Likewise, the description of this invention in the Field of Technology section is not limiting; instead it identifies, in a general, non-exclusive manner, a technology to which exemplary implementations of this invention generally relate. Likewise, the Title of this document does not limit the invention in any way; instead the Title is merely a general, non-exclusive way of referring to this invention. This invention may be implemented in many other ways.

BRIEF DESCRIPTION OF THE DRAWINGS

In FIGS. 1, 2, 3, and 4, the eye is looking right, left, up and down, respectively.

FIG. 7 shows a gaze-tracking system, including a display screen, cameras and optics.

The above Figures show some illustrative implementations of this invention, or provide information that relates to those implementations. However, this invention may be implemented in many other ways.

DETAILED DESCRIPTION

General

In illustrative implementations of this invention, during training, a camera captures visible light images of a user's eye, while the user is rotating her eye to look at known gaze points on a display screen, and while light from the display image is reflecting from the cornea of her eye. These camera images may be analyzed to determine the location of features in the reflection that correspond to features on the display. For any given feature located at (x,y) on the display plane and any gaze point d with coordinates (x',y') in that display plane, there corresponds an expected location (x", y") in the coordinate system of a camera image that captures the eye. In this technique, the appearance of the display image is precisely known, and thus any feature in the display image is recognizable, its (x,y) coordinate is known, and the expected location (x", y") in the camera image may be inferred.

FIGS. 1, 2, 3 and 4 are examples of photographs captured by a camera, in an illustrative implementation of this invention. These photographs show reflections of, among other things, visible light from a display screen. The reflections are reflecting from the cornea of an eye. In FIGS. 1, 2, 3, and 4, the eye is looking left, right, up and down, respectively, while light from the display screen reflects off the cornea.

Figure 1:
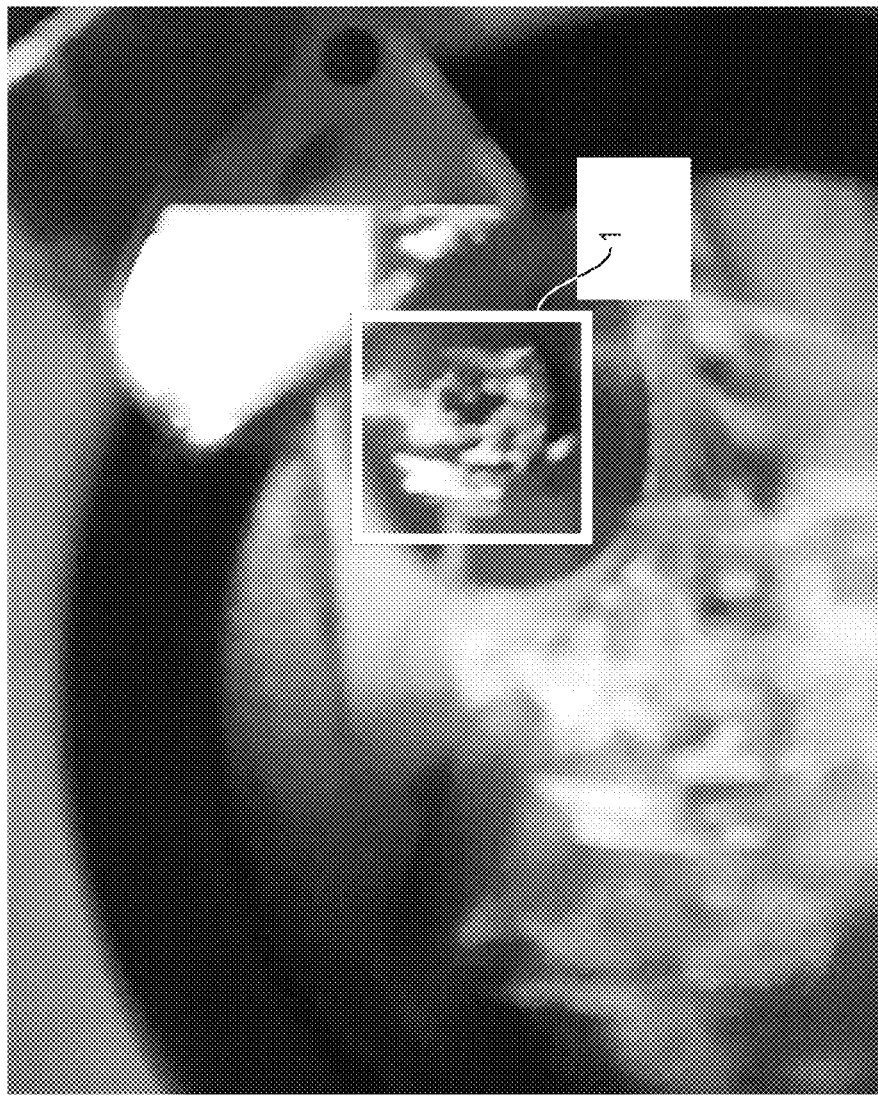
FIGS. 1, 2, 3 and 4 are photographs that show reflections of, among other things, light from a display screen. The reflections are reflecting from the cornea of an eye.

In FIG. 1, region 1 is the region of the camera image in which the display screen content is most clearly reflected from the cornea. Thus, region 1 is a region of interest ("ROI"). In illustrative implementations, visual data regarding reflections in the ROI may comprise inputs to a gaze-tracking algorithm.

Figure 2:
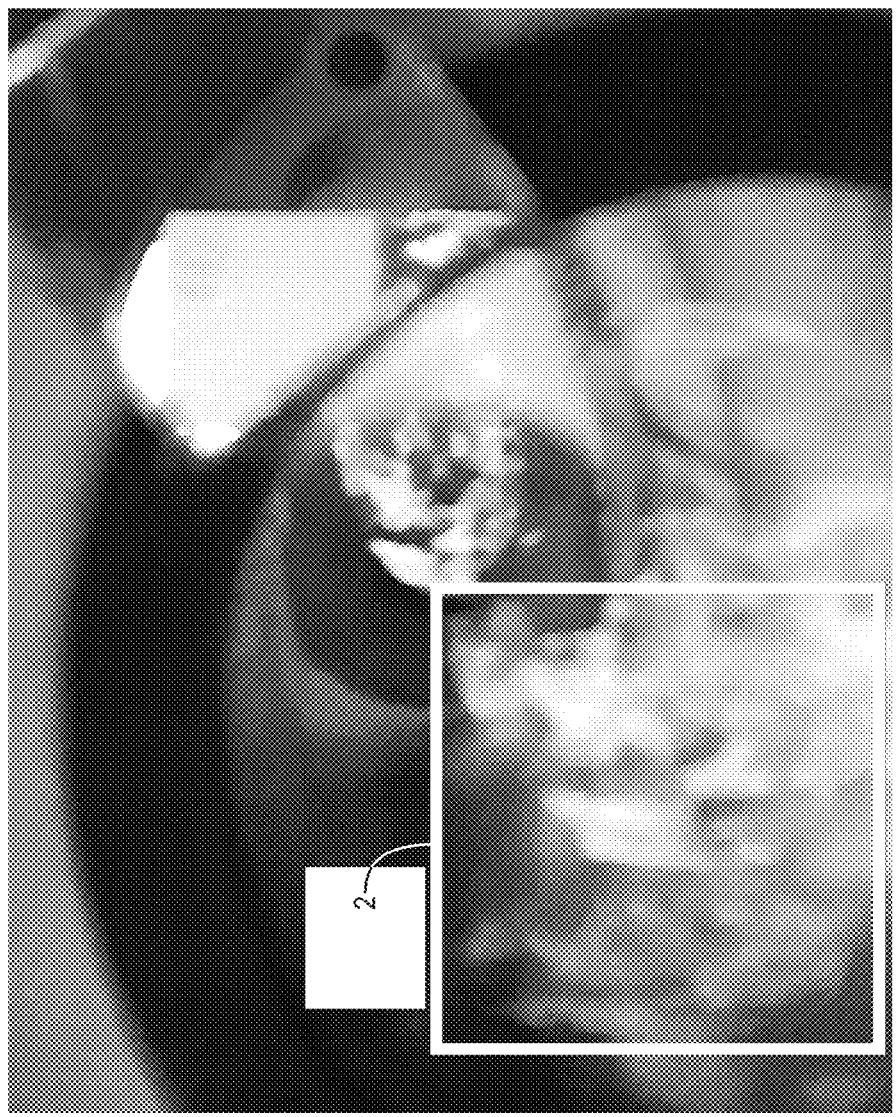

In FIG. 2, region 2 of the camera image is a region in which reflections of light from lenses occur. The light reflects off of lenses (such as lenses 711, 712) in the imaging system and then travels directly to the camera, without reflecting off of the eye. In illustrative implementations, these direct reflections of light from lenses may be disregarded as noise.

Figure 3:
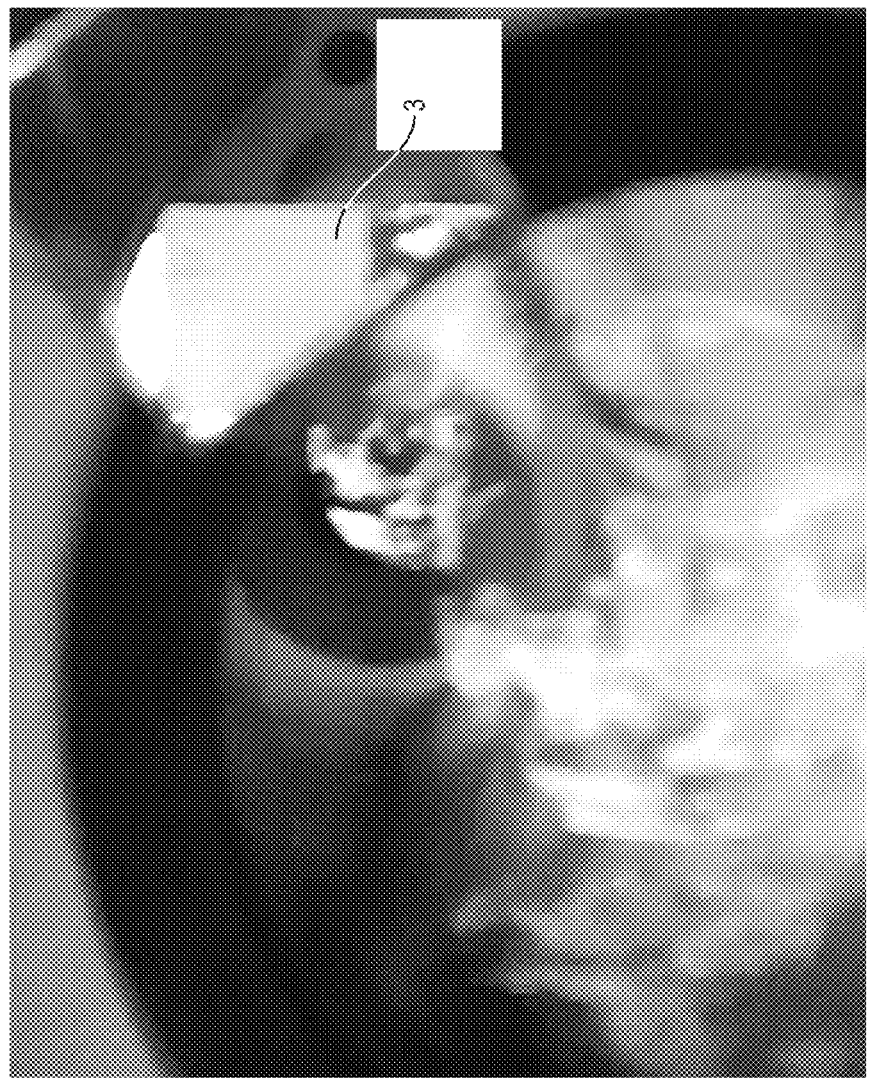

In FIG. 3, reflection of light from a mirror occurs in diamond-shaped region 3 of the camera image. Specifically, light from a display screen reflects from the mirror and then travels directly to the camera, without reflecting from the eye. The mirror reflects a visual timestamp that is displayed by a display screen.

Figure 4:

In FIG. 4, a small region of a display screen is displaying a time-stamp that varies over time. At the moment of time depicted in FIG. 4, the time-stamp says "4818". Light from this time-stamp reflects from the mirror and travels directly to the camera, without reflecting off the eye. Thus, a reflection of time-stamp "4818" occurs at region 4 of the camera image. This time-stamp facilitates training of the imaging system.

Figure 5:
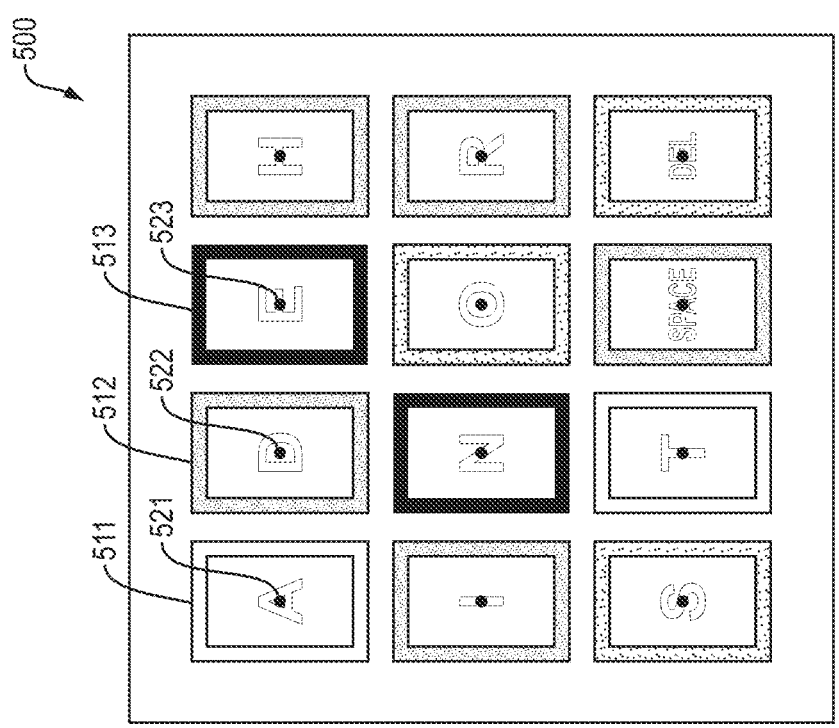
FIG. 5 shows a grid of fixation targets, for use during training.
Figure 6:
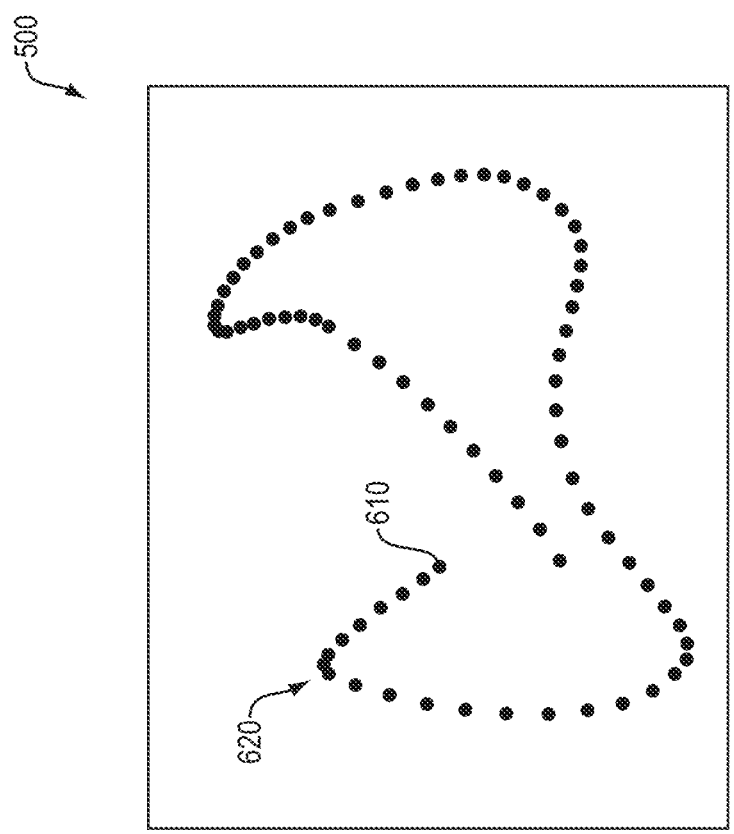
FIG. 6 shows a trajectory of fixation targets, for use during training.

In illustrative implementations of this invention, during training, a camera captures images while the eye looks at different gaze points in a display image. FIGS. 5 and 6 show two examples of fixation targets that induce the eye to look at different gaze points (and thus in different gaze directions) during training, in illustrative implementations of this invention. In FIG. 5, the display screen displays a static grid of fixation targets. In FIG. 6, the display screen displays an image that is static, except for a fixation target that appears to move in a trajectory through the display.

In the example shown in FIG. 5, a display screen 500 displays a display image of a three-by-four grid of tiles (e.g., 511, 512, 513). A fixation target (e.g., 521, 522, 523) is located at the center of each tile. Each tile has a character (e.g., a letter) to make it easier for a user to remember the last target which she looked at. During training, the user is instructed to look at the fixation targets in sequence. The fixation targets (e.g., 521, 522, 523) may pulsate in sequence, to induce an eye to look at the currently pulsating fixation target. A camera captures images as the eye looks at the different fixation targets, at least one camera image for each of the twelve eye orientations.

In the example shown in FIG. 6, a display screen 500 displays a display image that is static, except that a red dot 610 appears to move along a trajectory 620 through the display image. The user is instructed to follow the red dot as it moves. The red dot 610 may appear to move continuously. Or the red dot 610 may appear to move in discrete steps, by turning on and off in different locations in the display image. A camera captures a set of images as the eye looks at the red dot 610 in different positions along the trajectory, such that each image captures the eye looking at a different point in the trajectory. Alternatively, another fixation target may be employed, instead of a red dot.

In illustrative implementations, the user is instructed to hold still during training. Even though the user tries to hold still, small translations of the display screen or camera relative to the eye may occur during image acquisition. Errors caused by these small translations may be normalized (see, e.g., (i) discussion of global coordinate system in Summary section above and (ii) Steps M1 and M2 in the "Computing Discrete Mapping" section below).

Hardware

FIG. 7 shows a gaze-tracking system, including a display screen, cameras and optics, in an illustrative implementation of this invention.

In the example shown in FIG. 7, the system includes a display screen 701 and multiple cameras 702, 703, 704, 705. The display screen 701 displays an image while one or more of the cameras 702, 703, 704, 705 capture images of an eye (e.g., eye 730 or eye 731). These camera images capture a reflection of the display screen, reflecting from the cornea of the eye.

Optics 710 include a left lens 711 and right lens 712.

Although the number of cameras shown in FIG. 7 is four, the number of cameras may be less than four, four, or more than four. Placing cameras in different positions around the display makes it more likely that at least one camera will have an unoccluded view of the Purkinje image of the display screen that reflects from the cornea of the eye. Thus, placing cameras in different positions around the display tends to increase the size of the trackable field of view.

In illustrative implementations, if the system includes more than one camera, then gaze-tracking may be performed separately for each camera. For example, in a non-limiting example of a system that includes four cameras: (a) at a given time, the first and second cameras may have an unoccluded view of the cornea of the right eye, the third camera may have an unoccluded view of the cornea of the left eye, and the fourth camera may be occluded with no line of sight to either eye; and (b) at the given time, data from the first camera may be used to track pose of the right eye, data from the third camera may be used to track pose of the left eye, and data from the second and fourth cameras may be ignored.

The cameras may be positioned either on the eye-side of the optics 710 or on the display-side of the optics 710. Positioning the cameras on the eye-side of the optics 710 means that the distance between the cameras and the eyes is less than the distance between the optics 710 and the eyes. Positioning the cameras on the display-side of the optics 710 means that the distance between the cameras and the display screen is less than the distance between the optics 710 and the display screen.

An advantage of positioning the cameras eye-side of the optics 710 is that doing so eliminates the optics as a source of distortion and chromatic aberration in the captured images. An advantage of positioning the cameras display-side of the optics is that the cameras may—due to the increased distance from the eye—capture images of the entire eye (specifically, of the entire exterior surface of the eye that is not occluded by eyelids).

The display screen may comprise a single larger display, or may comprise smaller screens for the left and right eyes, respectively. In the latter case: (a) one or more inner cameras may be positioned in front of the display screen in an inter-display region that is not visible to the user; (b) optics 170 may cause this inter-display region to be outside of the user's field of view; and (b) one or more outer cameras may be positioned in an outer region that is laterally beyond the outer edge of a display screens.

In the example shown in FIG. 7, a computer 720 controls the display screen 701 and the cameras 702, 703, 704, 705. The computer 720 interfaces with input/output devices, including a keyboard 722, mouse 723, microphone 724, touch screen 725 and speaker 726. The keyboard 722, mouse 723, microphone 724 and touch screen 725 may accept input from a user. The touch screen 725 and speaker 726 may output information in humanly perceptible form. The touch screen 725 may display an interactive graphical user interface. The computer 720 may store data in, and read data from, memory device 721.

Figure 8:
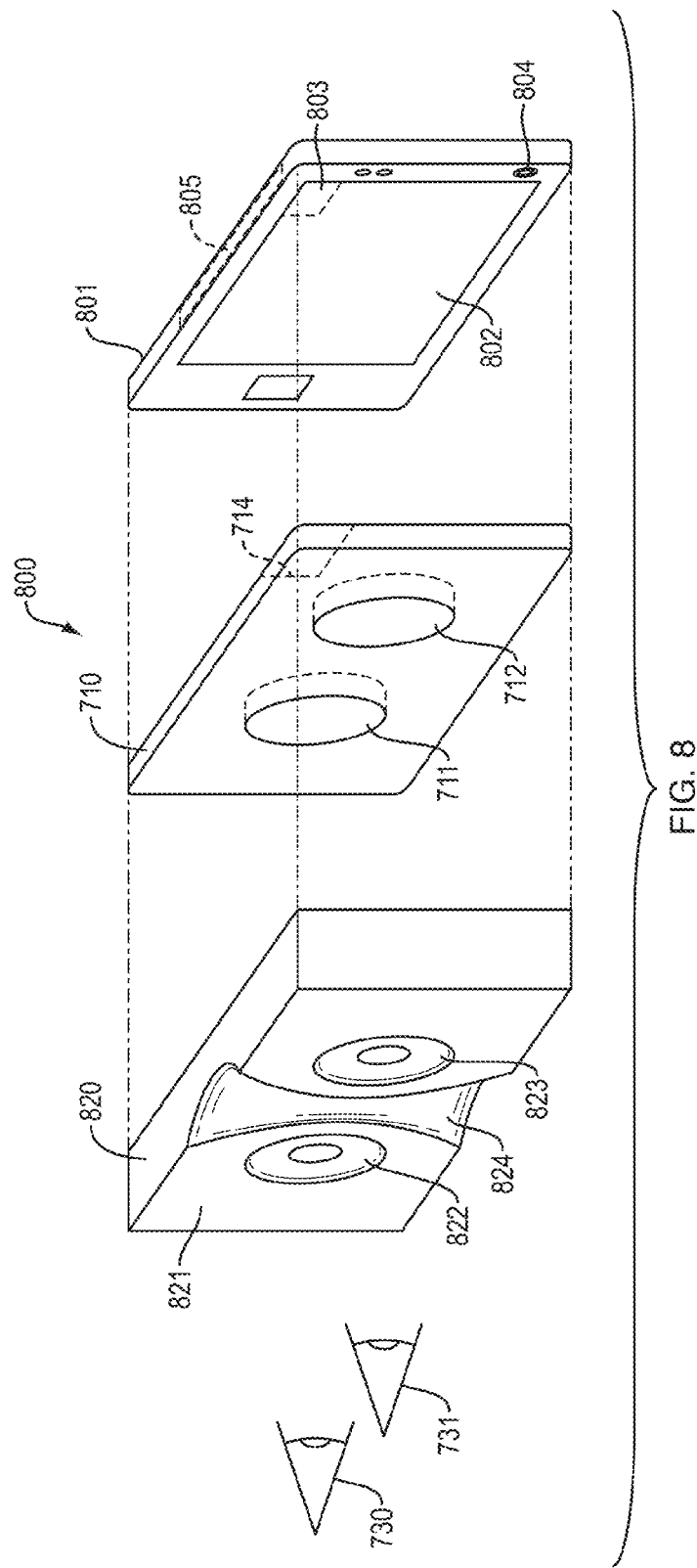
FIG. 8 shows a gaze-tracking system, including a smartphone and optics.

In FIGS. 7 and 8, lenses 711, 712 tend to converge light that passes through the lenses while traveling from the display screen to an eye (e.g., 730, 731). Thus, the lenses allow the display screen to be positioned much closer to the eyes than the minimum distance at which an unaided eye would be able to focus (e.g., much closer than 25 centimeters from the eye). Optics 710 include a mirror 714. The mirror 714 is positioned such that it: (a) reflects—directly to the cameras—a time stamp that is displayed on a portion of the display screen; and (b) is in the periphery of the user's field of view.

In some implementations of this invention, the display screen is a component in a head-mounted display (HMD) such as Google® Cardboard or is a component in a near-eye display apparatus that is configured to be viewed while pressed against or held up to the user's face.

In some cases, the display screen comprises a screen of a smartphone.

FIG. 8 shows a gaze-tracking system, including a smartphone and optics, in an illustrative implementation of this invention. In the example shown in FIG. 8, a smartphone 801 includes a display screen 802, a front-facing camera 804 and a computer 805. The display screen 802 displays a display image. Camera 804 captures images of the eye. These camera images include a reflection of the display image, reflecting from the cornea of an eye (e.g., 730, 731). A portion 803 of the display screen may display a visual time-stamp that changes over time.

In the example shown in FIG. 8, a portion 820 of the gaze-tracking system has a side 821 that is configured to be pressed against a human face. For example, side 821: (a) may include eye cups 822 and 823; and (b) may include an indentation 824 that fits snugly around a portion of a human nose, regardless of whether side 824 is rotated 180 degrees. (In some cases, the system shown in FIG. 8 can track only one eye at a time. In those cases, rotating the device by 180 degrees may change which eye is being tracked). Side 821 may conform to the shape of, and fit snugly against, a user's face when the eye cups are positioned in front of the user's eyes 730, 731.

In some implementations that employ a smartphone for the display screen (e.g., FIG. 8): (a) only one eye is tracked at a time; but (b) the user can select which eye through her choice of orientation of the system 800.

Many smartphones do not accurately synchronize camera frames with display frames. Thus, in some implementations, the mirror is added to reflect a timestamp displayed by the display screen. The camera captures an image of both the eye (including the reflection of the display screen, reflecting from the cornea of the eye) and the timestamp that is reflected by the mirror. Based on the timestamp shown in a camera image, a computer determines which display image corresponds to that camera image.

Purkinje Images that Vary Depending on Gaze Direction

In illustrative implementations of this invention: (a) a Purkinje image of a display image on a display screen reflects from the cornea of an eye that is looking at the display image; and (b) the position, orientation and shape of the Purkinje image changes as the orientation of the eye changes—i.e., as the eye looks in different directions.

In illustrative implementations, an eye is photographed from a consistent position while the eye is looking at the screen. There is a bijective mapping between eye positions and positions of the Purkinje image. A photograph of the eye, including this Purkinje image, contains information from which a computer may estimate the gaze point of the eye.

When considered from the camera's perspective, as the eye moves, both the position of the Purkinje image of the display screen, and the portion of the reflection that is visible, may change. If the eye is near the same position, many of the same features may be visible, but slightly offset and distorted; whereas if the eye is in a very different position, very few features may match—since they may be not visible or distorted beyond recognition.

Figure 9:
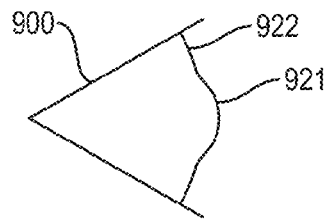
FIG. 9 shows a corneal bulge in an eye.

FIG. 9 shows a corneal bulge in an eye. The curve of the cornea 921 bulges out beyond the curve of the sclera 922 of the eye 900. The curve of the cornea distorts the reflection of the display screen, which reflects from the cornea.

Figure 10A:
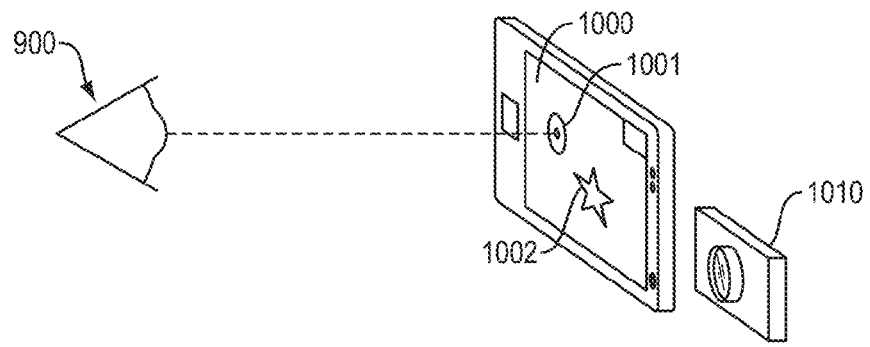
FIG. 10A shows an eye looking at a gaze point in a display screen that is displaying a star pattern.
Figure 10B:
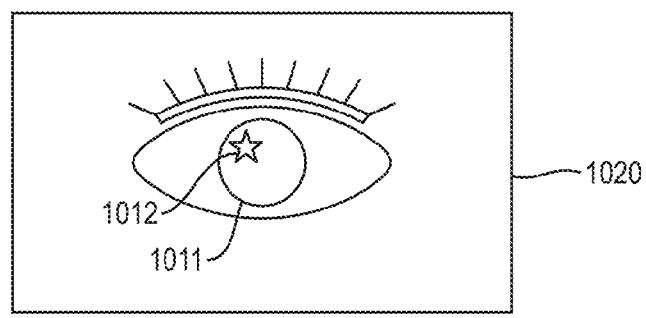
FIG. 10B shows a camera image that captures the star pattern reflecting from the eye.

FIGS. 10A and 10B illustrate how a camera may take images of an eye, in an illustrative implementation of this invention.

FIG. 10A shows an eye 900 looking at a gaze point 1001 on a display screen 1000 that is displaying a star pattern. A camera 1010 is oriented such that the camera may capture images of eye 900.

FIG. 10B shows a camera image 1020 of eye 900, which is captured by camera 1010 in the setup shown in FIG. 10A. This camera image 1020 captures reflections that are reflecting from eye 900, including a reflection 1011 of the pupil and a reflection 1012 of the star pattern. The position, orientation and shape of reflection 1012 of the displayed star pattern, as it appears in camera image 1020, depends on the gaze direction of eye 900 when camera image 1020 is captured.

Training

In some implementations of this invention, during training, a set of camera images are acquired of an eye, as the eye looks at a display image and the display image reflects from the cornea of the eye. The gaze direction of the eye is different for each camera image in the training, because the position of a fixation target—which is displayed in the display image and which the eye is following—changes from camera image to camera image.

In some implementations, during training, a computer calculates a mapping from the display image space to the camera image space: that is, a mapping that takes as inputs a display gaze point and a display image, and that outputs a camera image of the eye. Also, in some implementations, during training, a computer calculates an inverse mapping: that is a mapping that takes as input a camera image of the eye and that outputs a display gaze point.

Figure 11:
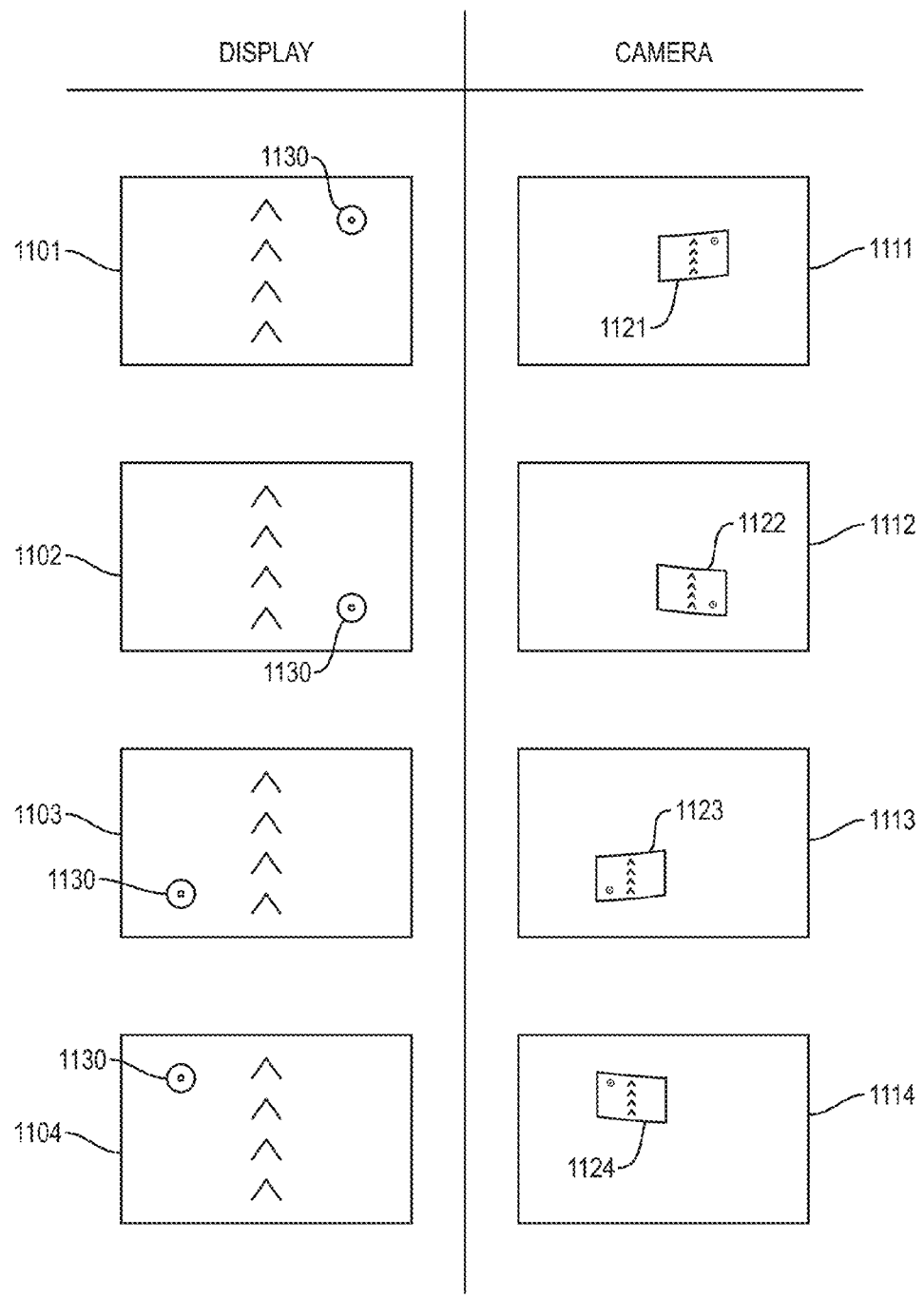
FIG. 11 shows training images.

FIG. 11 shows training images, in an illustrative implementation of this invention. Specifically, FIG. 11 shows both (a) display images that are displayed during training, and (b) camera images that capture Purkinje images of these display images.

In the example shown in FIG. 11, the left column is a temporal sequence of display images 1101, 1102, 1103, 1104 that are displayed by a display screen during training. These display images are identical to each other, except that the position of fixation target 1130 varies in the display images.

During training, the user is instructed to look at the fixation target. As the fixation target changes position in the display images, the gaze point changes and thus the gaze direction of the user's eye changes.

In FIG. 11, the right column is a temporal sequence of camera images 1111, 1112, 1113, 1114 that are captured by a camera. These camera images capture reflections 1121, 1122, 1123, 1124 of the display image, reflecting from the cornea of the eye. In each row of FIG. 11, the camera image on the right is what the camera captures while the display screen displays the display image on the left (and thus while the eye is oriented to looks at the fixation target displayed in that display image).

In examples shown in FIGS. 5, 6 and 11, the position of a fixation target (e.g., 521, 522, 523, 610, 1130) may change from display image to display image. position. In some cases (such as when comparing a "run" camera image to a set of training images in real time): (a) it may be desirable for the fixation targets to not appear in the captured camera images; and (b) each time that the camera captures an image, the display screen may display a fixation target while the eye orients to look at the fixation target and may then very briefly cause the fixation target to not be displayed while the camera image is captured.

In some implementations of this invention, during training, it is desirable to transform coordinates of camera gaze points in multiple camera images into global camera-space coordinates. The global camera-space may reconcile the information that each camera image provides In the absence of any error in measurement (e.g. due to a headset that supports the display screen and camera moving with respect to the face) relative offsets would paint a consistent picture—that is, given three points a, b, and c, the pairwise x- and y-offsets would lay out the points relative to one another in a consistent way, so that $\vec{c-a}=\vec{b-a}+\vec{c-b}$.

However, in practice, there is error and inconsistencies (e.g., due to translations of the display relative to the eye), and not every set of neighbors generates a valid estimate.

To solve this problem, a computer may perform a global optimization algorithm formulated as a linear program. The linear program may generate a consistent geometric layout—i.e., a global coordinate space—that takes into account all neighboring pairwise distance estimates, and that minimizes the overall deviation of these estimates.

In the linear program, variables x and y are 2D coordinates for the training points. If there are n total grid points, this gives 2n variables. In order to construct an objective function that penalizes both positive and negative deviations from the pairwise offsets, auxiliary variables are employed, to represent these offsets. That is, for each edge in the set of training points, say e(p,q), two sets of auxiliary variables $pq^+$ and $pq^-$ are employed in the optimization, each of which corresponds to a pair of separate x and y constraints ($pq^{+x}$, $pq^{-x}$, $pq^{+y}$, $pq^{-y}$). Let $o(p,q)_x$ and $o(p,q)_y$ be the geometric offsets computed between training points p and q. Equality constraints relate the auxiliary variables to the primary variables:

$$pq^{+x} - pq^{-x} = q_x - P_x - o(p,q)_x$$

$$pq^{+y} - pq^{-y} = q_y - P_y - o(p,q)_y$$

where $pq^{+x}$, $pq^{-x}$, $pq^{+y}$, $pq^{-y}$ are each defined to be greater than zero.

The x and y optimizations may be separated, so a computer may solve the 2D coordinate layout optimization problem as two 1D optimizations. The 1D optimization for the x coordinates has the form:

$$A_e x = b_e$$

$$Ax \geq b$$

$$\text{minimize } c^T x$$

where matrix $A_e$, vector $C^T$ and vector $b_e$ are as described below in the section titled "Computing Discrete Mapping". The 1D optimization for the y coordinates has the same form, except that y is substituted for X.

Figure 12:
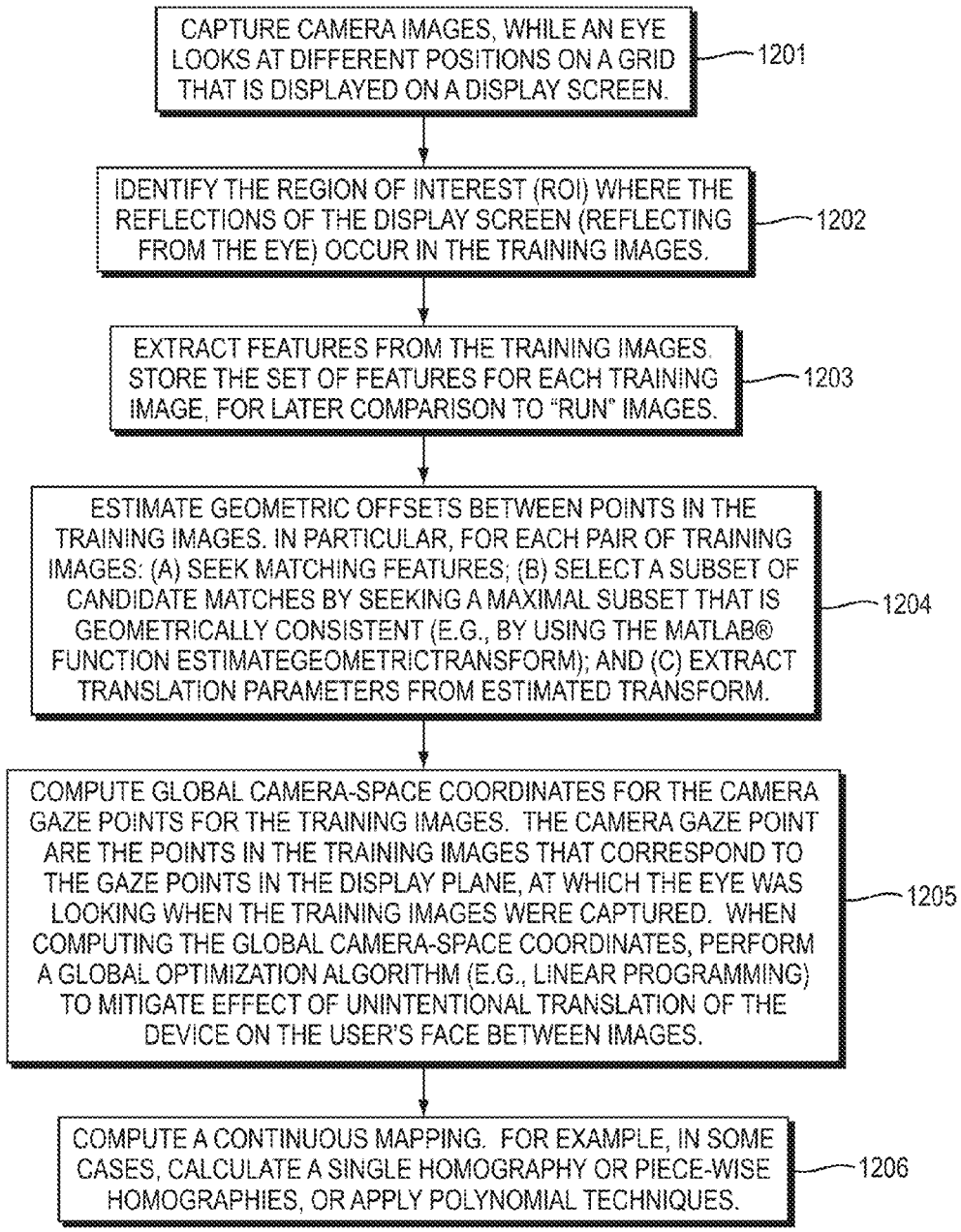
FIG. 12 is a flow chart for a method of training a gaze-tracking system.

FIG. 12 is a flow chart for a method of training a gaze-tracking system, in an illustrative implementation of this invention. In the example shown in FIG. 12, the method includes the following steps which occur during training: Capture camera images, while an eye looks at different positions on a grid that is displayed on a display screen (Step 1201). Identify the region of interest (ROI) where the reflections of the display screen (reflecting from the eye) occur in the training images (Step 1202). Extract features from the training images. Store the set of features for each training image, for later comparison to "run" images (Step 1203). Estimate geometric offsets between points in the training images. In particular, for each pair of training images: (a) seek matching features; (b) select a subset of candidate matches by seeking a maximal subset that is geometrically consistent (e.g., by using the Matlab® function estimateGeometricTransform); and (c) extract translation parameters from estimated transform (Step 1204). Compute global camera-space coordinates for the camera gaze points for the training images. The camera gaze points are the points in the training images that correspond to the gaze points in the display plane, at which the eye was looking when the training images were captured. When computing the global camera-space coordinates, perform a global optimization algorithm (e.g., linear programming) to mitigate effect of unintentional translation of the device on the user's face between images (Step 1205). Compute a continuous mapping. For example, in some cases, calculate a single homography or piece-wise homographies, or apply polynomial techniques (Step 1206).

Figure 13:
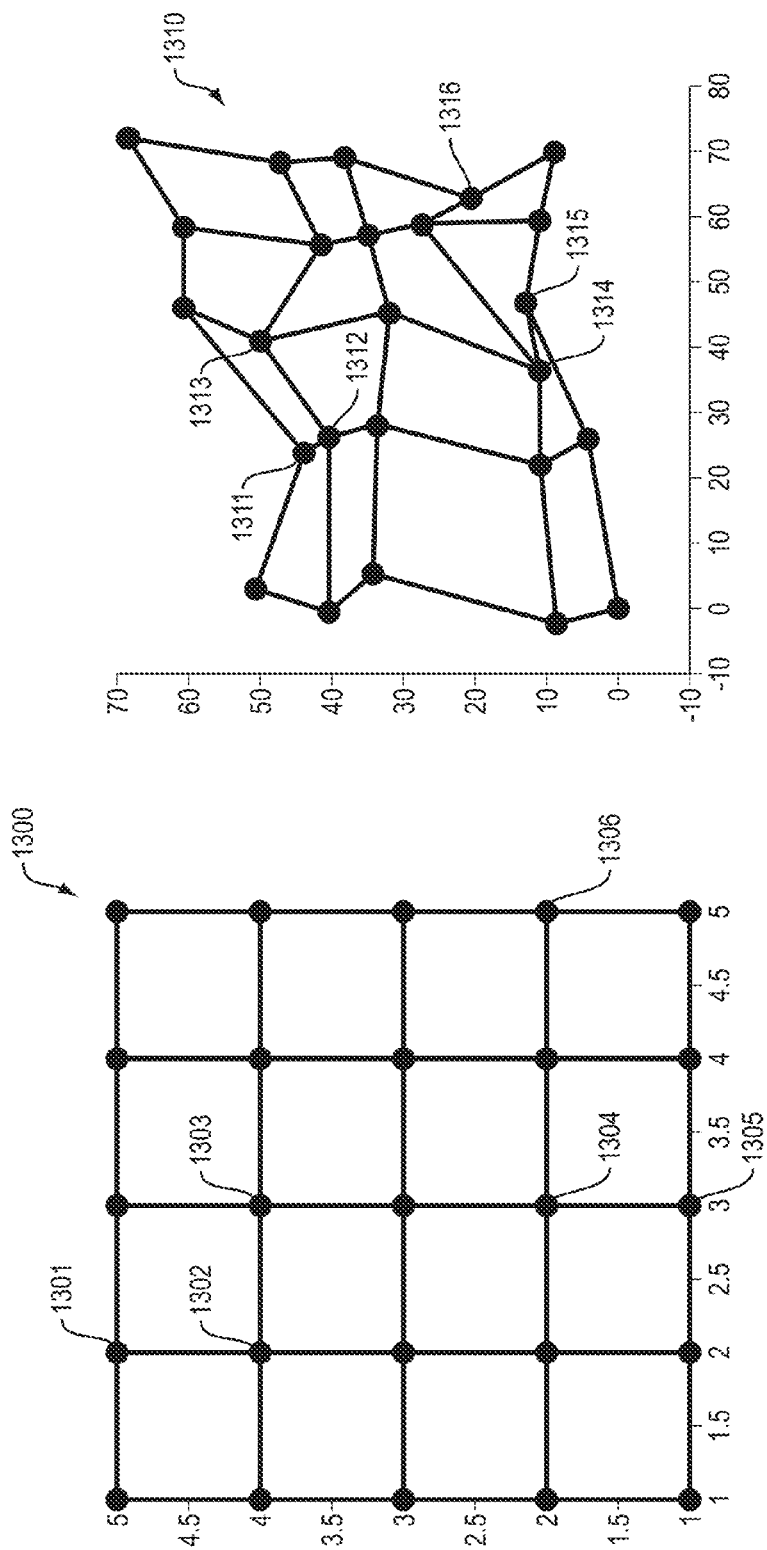
FIG. 13A shows a grid of display gaze points displayed during training.
FIG. 13B shows a grid of camera gaze points that results from transforming coordinates into global camera-space coordinates.

FIGS. 13A and 13B each show a grid, in an illustrative implementation of this invention. FIG. 13A shows a grid 1300 of display gaze points (e.g., 1301, 1302, 1303, 1304, 1305, 1306), as such grid appears in a display image displayed during training. FIG. 13B shows a grid 1310 of camera gaze points (e.g., 1311, 1312, 1313, 1314, 1315, 1316) that results from transforming coordinates into global camera-space coordinates. This transformation may, for example, transform coordinates for the camera gaze points that correspond to display gaze points 1301, 1302, 1303, 1304, 1305, 1306 into global camera-space coordinates, such that the transformed camera gaze points are located at points 1311, 1312, 1313, 1314, 1315, 1316 in grid 1310. This invention is not limited to the spatial arrangements of display gaze points and camera gaze points that are shown in FIGS. 13A and 13B.

In illustrative implementations, the transformation may "crumple" a grid of camera gaze points. For example, the transformation (of coordinates of camera gaze points into global camera-space coordinates) may cause a rectangular grid of camera gaze points to be crumpled in the global camera-space. For example, grid 1310 in FIG. 13B appears crumpled.

This transformation into global camera-space coordinates may be achieved by performing an optimization algorithm, as described herein.

Estimating Pose of Eye Looking at Calibrated Image

In some use scenarios for this invention, a computer determines the gaze direction of an eye that is looking at an image that was previously displayed during training.

Figure 14:
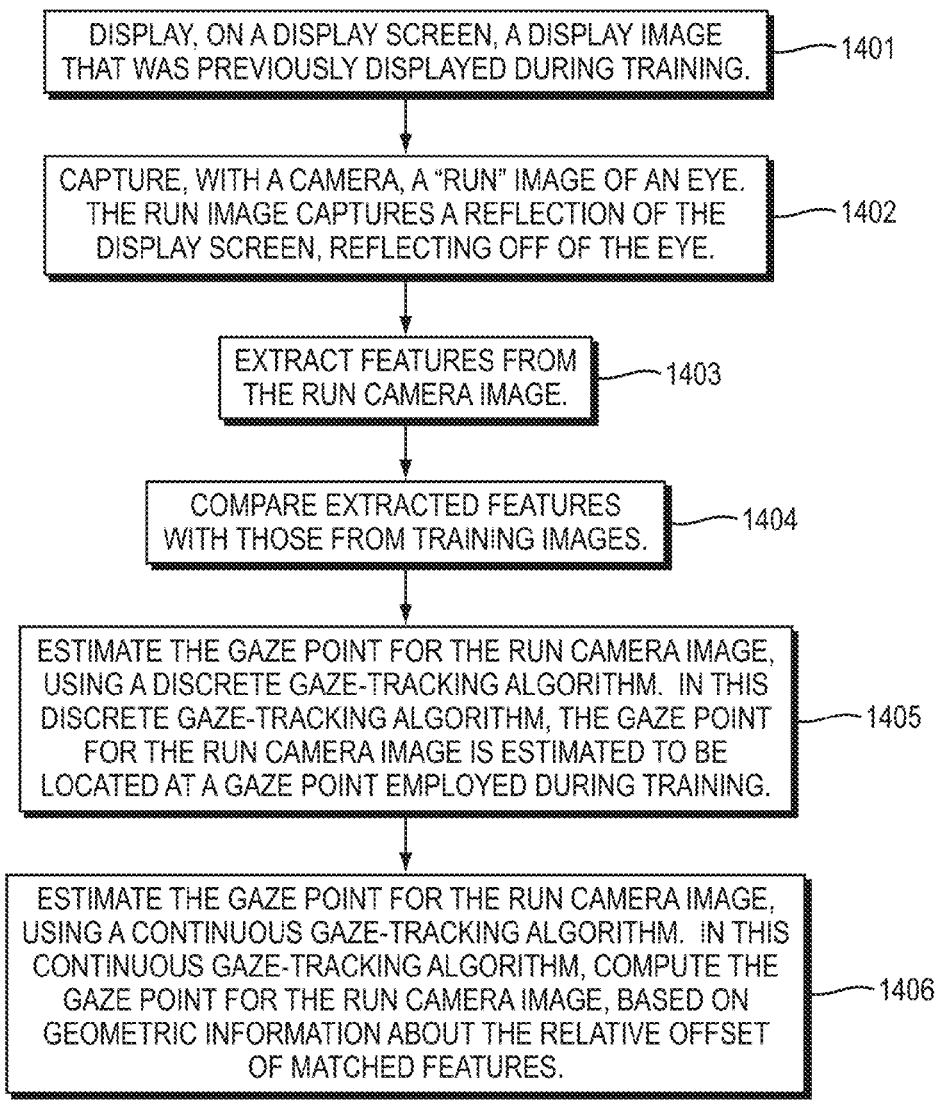
FIG. 14 is a flow chart for a method for estimating gaze direction of an eye that is looking at an image that was previously displayed during training.

FIG. 14 is a flow chart for a method of estimating gaze direction, in an illustrative implementation of this invention. Specifically, the method is for estimating gaze direction of an eye that is looking at an image that was previously displayed during training. In the example shown in FIG. 14, the method includes the following steps: Display, on a display screen, a display image that was previously displayed during training (Step 1401). Capture, with a camera, a "run" image. The run image captures a reflection of the display screen, reflecting off of the eye (Step 1402). Extract features from the run camera image (Step 1403). Compare extracted features with those from training images (Step 1404). Estimate the gaze point for the run camera image, using a discrete gaze-tracking algorithm. In this discrete gaze-tracking algorithm, the gaze point for the run camera image is estimated to be located at a gaze point employed during training (Step 1405). Estimate the gaze point for the run camera image, using a continuous gaze-tracking algorithm. In this continuous gaze-tracking algorithm, compute the gaze point for the run camera image, based on geometric information about the relative offset of matched features (Step 1406).

In the method shown in FIG. 14, Step 1405 (discrete gaze-tracking) may be omitted, in which case the system may perform only continuous gaze-tracking. Alternatively, Step 1406 (continuous gaze-tracking) may be omitted, in which case the system may perform only discrete gaze-tracking.

In some implementations, a computer performs feature extraction (i.e., detects features in a training camera image or run-time camera image) as follows: A computer executes a local feature detection algorithm, in order to detect local features in each camera image. For example, the local feature detection algorithm may comprise a SURF (Speeded Up Robust Features) or MSER (Maximally Stable Extremal Regions) algorithm for detecting blobs, or may comprise a FAST (Features from Accelerated Segment Test) algorithm, Harris algorithm, or a Shi & Tomasi minimum eigenvalue algorithm for detecting corners. For example, the computer may perform a Matlab® program that calls on the detectSURFFeatures function or detectMSERFeatures function for blob detection, or that calls on the detectFASTFeatures function, detectHarrisFeatures function or detectMinEigenFeatures function for corner detection.

In some implementations that involve discrete gaze-tracking, a computer performs steps 1404 and 1405 (comparing features and determining closest match) as follows: A computer may perform an algorithm (a) to compare features in a run-time image with features in training images and (b) to determine which training image is the closest match to the run-time image. As used herein, to say that a mapping is "continuous" means that the range (set of possible outputs) of the mapping comprises a set of points that includes both (i) training gaze points and (ii) other points in a display surface. In some cases, the range of a continuous mapping may comprise all of the display pixels in a display surface. As used herein, to say that a mapping is "continuous" does not create any implication regarding whether the domain or range of the mapping is continuous in a mathematical sense. Any conventional method may be used to compare the features and to determine which image is the closest match. For example, conventional approaches described in the following two papers may be employed: (1) Sivic, J. et al., *Video Google: A text retrieval approach to object matching in videos*, ICCV (2003) pg 1470-1477; and (2) Philbin, J., et al., *Object retrieval with large vocabularies and fast spatial matching*, CVPR (2007).

As used herein, to say that a computer performs "continuous gaze tracking" means that the computer estimates gaze point based on a continuous mapping.

Continuous gaze tracking (Step 1406) may estimate gaze direction with more precision than discrete gaze tracking. In continuous gaze tracking (Step 1406), the estimated gaze point is not limited to one of the gaze points used during training; and (b) the estimated gaze point may be located between two gaze points used for training. Put differently, in continuous gaze tracking (Step 1406), the estimated gaze point is not required to be one of the grid points in a grid of gaze points that were used during training.

Estimating Pose of Eye for an Image that is not Calibrated

The example shown in FIG. 14 involves gaze tracking for an eye that is looking at a "calibrated" display image—that is, a display image that was displayed during training.

Figure 15:
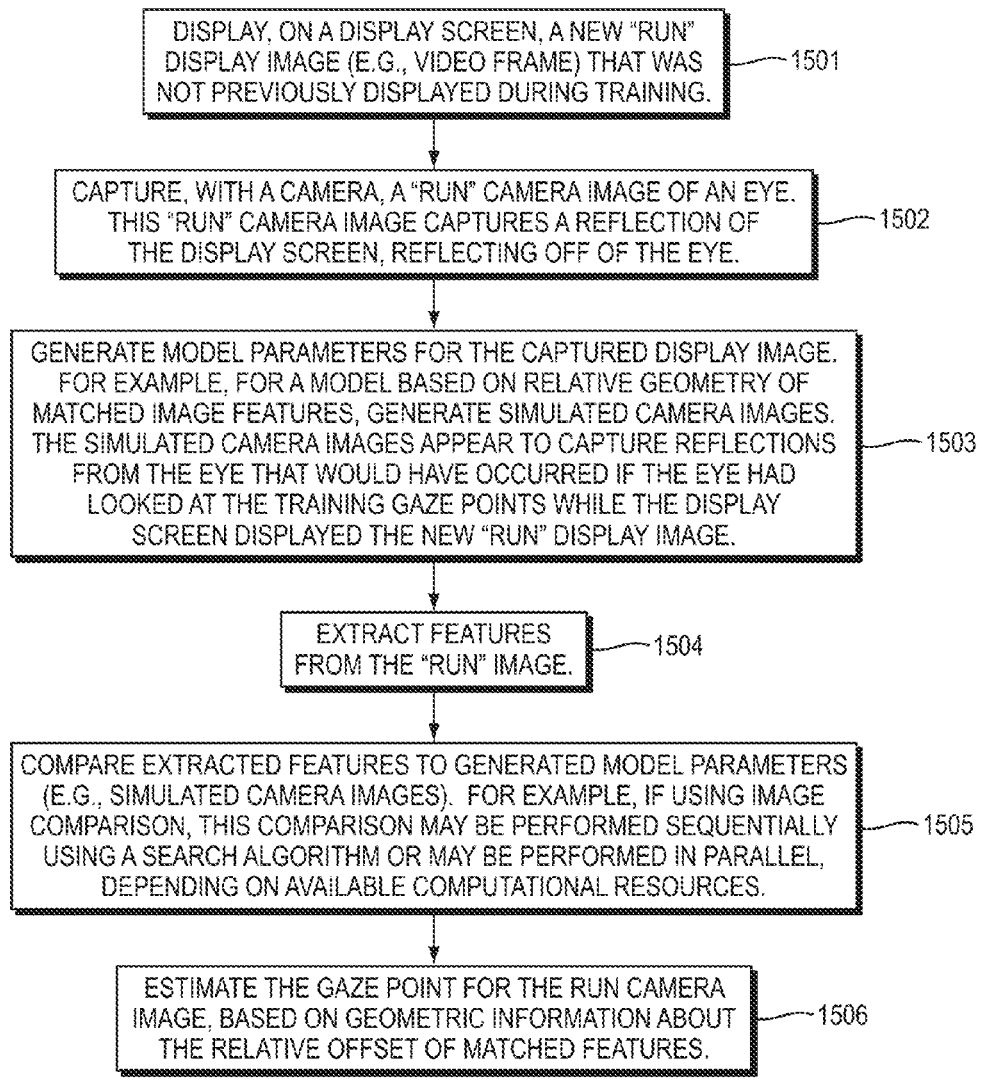
FIG. 15 is a flow chart for a method for estimating gaze direction of an eye that is looking at a new image that was not previously displayed during training.

However, in many practical use scenarios, the eye is not looking at a calibrated display image. Instead, in many practical implementations of this invention, the eye is looking at a display image that is "new" or "unknown"—that is, which was not previously displayed during training. For example, this may occur if a user is looking at a video, or at an interactive graphical user interface FIG. 15 is a flow chart for a method for estimating gaze direction of an eye that is looking at a new image that was not previously displayed during training. In the example shown in FIG. 15, the method includes: Display, on a display screen, a new "run" display image (e.g., video frame) that was not previously displayed during training (Step 1501). Capture, with a camera, a "run" camera image of the eye. This "run" camera image captures a reflection of the display screen, reflecting off of the eye (Step 1502). Generate model parameters for the captured display image. For example, for a model based on relative geometry of matched image features, generate simulated camera images. The simulated camera images appear to capture reflections from the eye that would have occurred if the eye had looked at the training gaze points while the display screen displayed the new "run" display image (Step 1503). Extract features from the "run" image (Step 1504). Compare extracted features to generated model parameters (e.g. simulated camera images). For example, if using image comparison, this comparison may be performed sequentially using a search algorithm or may be performed in parallel, depending on available computational resources (Step 1505). Estimate the gaze point for the run camera image, based on geometric information about the relative offset of matched features (Step 1506).

Also, the geometric distortion and point spread functions of the lens may be modeled, in order to facilitate efficient, parallel generation of the simulated images by a GPU (graphics processing unit).

Figure 16:
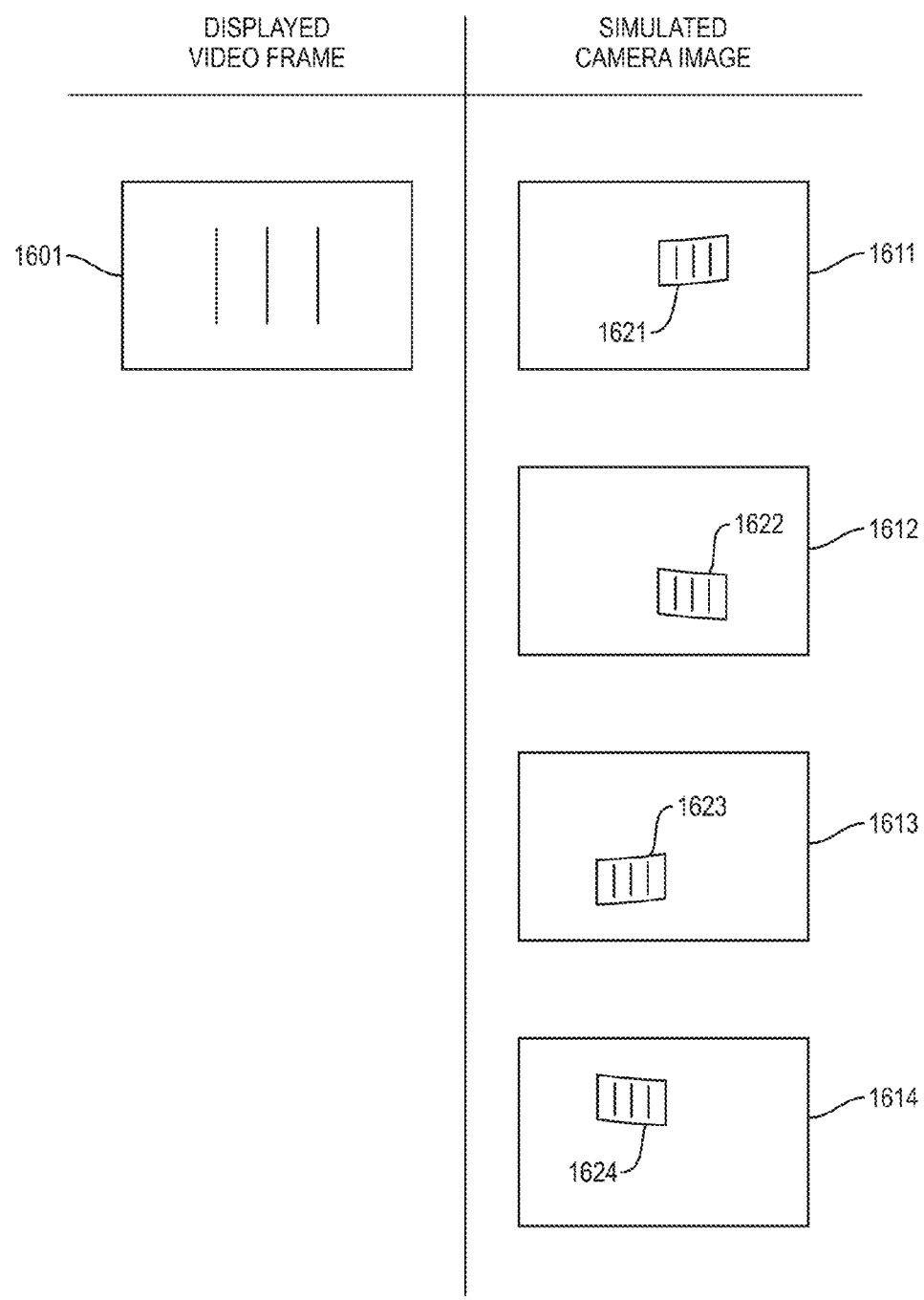
FIG. 16 shows, among other things, simulated camera images.

FIG. 16 shows, among other things, simulated camera images, in an illustrative implementation of this invention. In the example shown in FIG. 16, "run" display image 1601 was not displayed during training, but is currently being displayed by a display screen. For example, the "run" displayed image 1601 may be a frame in a video that was not displayed during training, or may be a GUI in a visual state that was not displayed during training. Based on a model trained on training images, a computer simulates camera images 1611, 1612, 1613, 1614. These four simulated images 1611, 1612, 1613, 1614 simulate camera images that would have captured Purkinje images of the displayed image 1601 reflecting from the eye, if the eye were looking at four different training gaze points, respectively, in displayed image 1601. The simulated camera images appear to capture images 1621, 1622, 1623, 1624 of the Purkinje images of the display image 1601. The position, orientation and shape of the Purkinje images (as apparently captured in the simulated images) varies from simulated image to simulated image, due to the different gaze points employed when generating the simulated images.

Terminology

The following terminology may be employed to describe illustrative implementations of this invention.

"D" means the coordinate system for the (x,y) coordinates of pixels in a display screen.

"C" means the coordinate system for the (x,y) coordinates of pixels in a camera image.

"G(C)" means a coordinate system of (x,y) coordinates of pixels in a transformed camera image that minimizes a sum of normalized pairwise geometric offsets between camera gaze points for a set of camera images. In some implementations of this invention, G(C) is used to estimate gaze points in D from an approximate model of $\Omega$.

"R" means RGB color specifications for pixels in a display screen or in a camera image.

"M(D)" means the set of images $m_D$ in the D coordinate space, each of which is a mapping D→R "M(C)" means the set of images $m_C$ in the C coordinate space, each of which is a mapping C→R "$\Omega$" is a display-camera model, which is a mapping of D×M(D)→M(C), where X means a Cartesian product. That is, when the system has a complete model $\Omega$, the system may choose any gaze point d∈D where the user is looking, and a display image $m_D$ shown on a display surface, and compute the expected camera image $m_C$.

"$\Omega_M(m_D)$" means a model $\Omega$ with an input image $m_D$ held constant, yielding a mapping D→M(C).

"$\Omega_M^{-1}(m_D)$" means an "oracle" function M(C)→D that: (a) is the inverse of "$\Omega_M(m_D)$"; and (b) maps a camera image $m_C$ to its corresponding gaze point d "$\delta_C(i,j)$" means, for a given i and a given j, the offset between features in $m_{Ci}$ and $m_{Cj}$.

"g" means a one-to-one mapping of points in D to points in G(C), which is defined only for a domain in D that consists of training gaze points $d_i$. Thus: (a) g maps each respective training gaze point in D to a unique point in G(C); and (b) g does not map more than one training gaze point in D to the same point in G(C).

"$\tilde{g}$" means a one-to-one mapping of points in D to points in G(C), such that: (i) the domain of g includes the set of training gaze points $d_i$ and other points in the display screen as well; and (ii) $g(d_i) \cong \tilde{g}(d_i)$.

"$L(m_D)$" means a set of training images captured by a camera, and, for each respective training image in the set, the corresponding gaze point at which the eye was looking when such training image was captured. In other words, "$L(m_D)$" means a set of pairs $(d_i, m_{Ci})$, i=1, . . . , n with $d_i$ ∈D and $m_{Ci}$∈M(C)

In illustrative implementations of this invention, training (or calibration) prepares the system to operate in a particular context (e.g., a context that comprises a particular user). In contrast, run-time occurs after training, during normal (non-training) operation of the system. During run-time (also know as run), camera images are acquired, from which the user's gaze direction during run-time may be inferred.

Discrete Gaze Tracking for Calibrated Image

Step 1405 in FIG. 14 involves discrete gaze tracking. Here are more details regarding discrete gaze tracking.

In illustrative implementations of this invention, a computer performs discrete gaze tracking to estimate the pose of an eye looking at a calibrated image. This discrete gaze tracking may be described as "classification," because the information it produces at run-time is an assignment to a discrete category, such as a grid box where the gaze is thought to lie. In some cases, the discrete gaze tracking algorithm selects which training camera image is the best match for a run-time camera image, and then estimates that the eye's gaze point for the run-time camera image is the same as that for the best-matching training image. In some cases, when performing discrete gaze tracking for an eye looking at a calibrated display image, the range (set of possible outputs) of the discrete gaze tracking is the set of gaze points used during training.

In illustrative implementations of this invention, discrete gaze tracking (of the gaze of an eye looking at a calibrated image) may comprise the following three steps (Steps D1-D3):

Step D1 (training): Capture a set of n camera images of an eye, while the eye looks at a display image being displayed by a display surface. Assemble a dataset $L(m_D)$, which comprises these camera images $m_{Ci}$, i=1, . . . , n, paired with points in $d_i \in D_i$=1, . . . , n, where the user was looking while they were captured. These points $d_i \in D$ are the respective training gaze points at which the eye is looking when the n camera images in dataset $L(m_D)$ are captured. For example, the first camera image is captured while the eye looks at a first gaze point in the displayed image, and the second camera image is captured while the eye looks at a second gaze point in the displayed image, and so on.

Step D2 (run-time): Capture an image $\overline{m}_C$ of the eye gazing at an unknown location with the image $m_D$ shown on the display.

Step D3 (run-time): Perform image matching (e.g. feature-based) between $\overline{m}_C$ and the images $m_{Ci}$ from the training set. Return $d_i$ corresponding to the best match (that is, determine which training image is the best match to the run-time camera image, and then estimate that the eye is looking at the same gaze point in the run-time camera image as the gaze point for that training image).

Continuous Gaze Tracking for Calibrated Image

Step 1406 in FIG. 14 involves continuous gaze tracking. Here are more details regarding continuous gaze tracking.

In illustrative implementations of this invention, a computer performs continuous gaze tracking to estimate the pose of an eye looking at a calibrated image. In the continuous gaze tracking, the estimated gaze points are not limited to the gaze points used during training. For example, the continuous gaze tracking may estimate that the gaze point for the run-time image is at a pixel that is located between two gaze points which were used for training.

In illustrative implementations of this invention, continuous gaze tracking (of an eye looking at a calibrated image) may comprise the following six steps (Steps C1-C7):

Step C1 (training): Capture a set of n camera images of an eye, while the eye looks at a display image being displayed by a display surface. Assemble a dataset $L(m_D)$, which comprises these camera images $m_{Ci}$, i=1, . . . , n, paired with gaze points $d_i \in D_i$=1, . . . , n, where the user was looking while they were captured. These points $d_i \in D$ are the respective training gaze points at which the eye is looking when the camera images in dataset $L(m_D)$ are captured. For example, the first camera image is captured while the eye looks at a first gaze point in the display image, and the second camera image is captured while the eye looks at a second gaze point in the display image, and so on.

Step C2 (training): Compute the discrete mapping g from D to G(C), (as described below in the section titled "Computing Discrete Mapping."

Step C3 (training): Compute a continuous inverse mapping $\tilde{g}^{-1}$. The range of this continuous inverse mapping comprises both (i) display pixels located at training gaze points and (ii) other display pixels. One example of such a mapping is a homography, using a homogeneous linear least-squares fitting procedure.

Step C4 (run-time): Capture a camera image $\overline{m}_C$ of the eye gazing at an unknown location with the image $m_D$ shown on the display.

Step C5 (run-time): Use the offset computation algorithm (which is described below in the section titled "Offset Computation Algorithm") to compute $\delta(\overline{m}_C, m_{Ci})$ for all $m_{Ci}$ in $L(m_D)$. When seeking to compute an offset between two images, the estimategeometrictransform method may find a certain number of points that all obey a particular geometric transform very precisely. If the images do not actually match, or if the method has not matched the right features, the method may come back with a very small number of points, like 2 or 3 points, that appear to map onto each other, but due to the very small number of points, these estimates may be bogus. So a valid estimate is one that maps at least a threshold number of points. For example, in a prototype of this invention, the threshold is set at 5, 6, 7 or 8. Suppose that valid offset estimates are produced for indices $i \in \{k_1, \ldots, k_{\overline{n}}\}$, where $\overline{n}$ is equal to the number of calibration points that produce valid estimates of the location of the run-time image ($\overline{n}$ is greater than or equal to the threshold).

Step C6 (run-time): Compute an estimate $\overline{\gamma} \in G(C)$ using the formula:

$$\overline{\gamma} = \frac{1}{\overline{n}} \sum_{j=1}^{\overline{n}} g(d_{k_j}) + \delta(\overline{m}_C, m_{Ck_j})$$

where $\overline{\gamma}$ is the estimated camera gaze point of the run-time camera image.

Step C7 (run-time): Return $\overline{d} = \tilde{g}^{-1}(\overline{\gamma})$, where $\overline{d}$ is the estimated gaze point for the camera image $\overline{m}_C$ that was captured in Step C4.

Gaze-Tracking for New Images that are not Calibrated

In some implementations of this invention, a gaze-tracking system estimates the pose of an eye, while the eye is looking at a display image that is "unknown" or "new". As used herein, to say that an image is "unknown" or "new" means that it has not been previously displayed during training. For example, a new image may be displayed while a user looks at a video or at an interactive, graphical user interface.

In some implementations of this invention, gaze-tracking for an eye that is looking at a new image (i.e., at a display image that was not displayed during training) includes the following nine steps (Steps U1-U9):

Step U1 (training): Capture a set of n camera images of an eye, while the eye looks at a display image displayed by a display surface. Assemble a dataset $L(m_D)$, which comprises these camera images $m_{Ci}$, $i=1, \ldots, n$, paired with points in $d_i \in D$ $i=1, \ldots, n$, where the user was looking while they were captured. These points $d_i \in D$ are the respective training gaze points at which the eye is looking when the n camera images in dataset $L(m_D)$ are captured. For example, the first camera image is captured while the eye looks at a first gaze point in the display image, and the second camera image is captured while the eye looks at a second gaze point in the display image, and so on.

Step U2 (training): Compute the discrete mapping g from D to G(C) (as described below in the section titled "Computing Discrete Mapping")

Step U3 (training): Compute a continuous inverse mapping $\tilde{g}^{-1}$. The range of this continuous inverse mapping comprises both (i) display pixels located at training gaze points and (ii) other display pixels. A non-limiting example of inverse mapping $\tilde{g}^{-1}$ is a homography, using a homogeneous linear least-squares fitting procedure.

Step U4 (training): Fit a five-parameter model of the eye to the set of camera images in $L(m_D)$, as described in the section below titled "Fitting Ray-Traced Eye Model". The five parameters are $x_0$, $y_0$, which represent displacement of the eye from a point in the display plane, $r_p$ and $r_s$ the primary and secondary radii of the eye, and d the shortest distance from the eye to the display plane.

Step U5 (run-time): Capture a camera image $\overline{m}_C$ of the eye gazing at an unknown gaze point while new display image $\overline{m}_D$ is shown on the display.

Step U6 (run-time): Compute a simulated set of camera images $L(\overline{m}_D)$, by computing $\overline{m}_{Ci} = \Omega(d_i, \overline{m}_D)$ for the new display image $\overline{m}_D$ and for each training gaze point $d_i$ used in Step U1.

Step U7 (run-time): Use the offset computation algorithm (which is described below in the section titled "Offset Computation Algorithm") to compute $\delta(\overline{m}_C, m_{Ci})$ for all $m_{Ci}$ in the simulated $L(m_D)$. Suppose that valid offset estimates are produced for indices $i \in \{k_1, \ldots, k_{\overline{n}}\}$.

Step U8 (run-time): Compute an estimate $\overline{\gamma} \in G(C)$ using the formula:

$$\overline{\gamma} = \frac{1}{\overline{n}} \sum_{j=1}^{\overline{n}} g(d_{k_j}) + \delta(\overline{m}_C, m_{Ck_j})$$

where $\overline{n}$ is equal to the number of calibration points that produce valid estimates of the location of the run-time image, and $\overline{\gamma}$ is the estimated camera gaze point of the run-time camera image.

Step U9. (run-time) Return $\overline{d} = \tilde{g}^{-1}(\overline{\gamma})$, where $\tilde{g}^{-1}$ is the inverse mapping computed in Step U3, and where $\overline{d}$ is the estimated gaze point for the camera image $\overline{m}_C$ that was captured in Step U5 while the eye was looking at the new display image $\overline{m}_D$.

Thus, the output of Steps U1-U9 is an estimate of the gaze point $\overline{d}$ of an eye that is looking at a new image shown in the display plane (such as a new frame in a video). This estimate may be calculated in real-time (e.g., by parallel computation).

Steps C5, C6, and C7 may be performed as a 2D calculation. Alternatively, steps C5, C6, and C7 may be performed as two separate 1D computations: that is, one for the x coordinate of the display gaze point and the other for the y coordinate of the display gaze point. Each of these 1D computations: (a) calculates the normalized geometric offsets in only one dimension (i.e., along the x-axis or along the y-axis); and (b) calculates the position of the display gaze point in only one dimension (i.e., along the x-axis or along the y-axis).

Similarly, Steps U7, U8, and U9 may be performed as a 2D calculation. Alternatively, steps U7, U8, and U9 may be performed as two separate 1D computations: that is, one for the x coordinate of the display gaze point and the other for the y coordinate of the display gaze point.

Offset Computation Algorithm

Steps C5 and U7 (which are described above) each involve performing an offset computation algorithm. The offset computation algorithm takes as arguments two input images $m_{Ck}$ and $m_{Cl}$, and either produces an estimate of the geometric offset between matching parts of the two, or terminates with the conclusion that the images do not match.

In some implementations of this invention, the offset computation comprises the following four steps (Steps G1-G4).

Step G1: Compute a vocabulary of visual words (e.g., SURF features) for each of the two images $m_{Ck}$ and $m_{Cl}$.

Step G2: Compute candidate pairs of matching features.

Step G3: Compute a maximal subset (say, cardinality n) of these features that can be mapped to each other within a small threshold using a single projective mapping P (which can rotate, scale, and offset). Call this mapping P.

Step G4. Compute the average translational offset between corresponding features. That is $$\delta(m_{Ck}, m_{Cl}) = \frac{1}{n}\sum_{i=1}^{n}((x_i, y_i) - P(x_i, y_i))$$

Note that Step G4 is not the same as extracting just the translation components of the projective mapping, since the rotational components also contribute to the translational offsets of mapped points.

Computing Discrete Mapping

Steps C2 and U2 (which are described above) each involve computing the discrete mapping g from D to G(C)

In illustrative implementations of this invention, a computer calculates a discrete mapping g: D→G(C) with the property that for each i, j, $g(d_j)-g(d_i) \cong \delta_C(i,j)$. This calculation comprises the following two steps (M1-M2):

Step M1: Compute geometric offsets $\delta_{ij}=\delta_C(i,j)$ between all pairs of training images in $m_{Ci}, m_{Cj}$ in $L(m_D)$.

Step M2. Compute $g(d_i)$ by solving the optimization problem that minimizes:

$$\sum_i \sum_j \left| g(d_j) - g(d_i) - \delta_{ij} \right|$$

In Step M2, the variables to solve for are the x, y coordinates of $g(d_i)=(g(d_i)_x, g(d_i)_y)$ for all i. Step M2 may be solved by a linear programming, as follows: In order to use a linear programming approach to solve the optimization in Step M2, introduce auxiliary variables $\Delta_{ij}^+$ and $\Delta_{ij}^-$ to represent positive and negative deviations from offsets $\delta_{ij}$ between candidate values of $(g_{ix}, g_{iy})=g(d_i)$.

$$\Delta_{ij}^{x+}=g_i^x-g_j^x-\delta_{ij}^x$$

$$\Delta_{ij}^{x-}=-g_i^x+g_j^x+\delta_{ij}^x$$

$$\Delta_{ij}^{y+}=g_i^y-g_j^y-\delta_{ij}^y$$

$$\Delta_{ij}^{y-}=-g_i^y+g_j^y+\delta_{ij}^y$$

The x and y optimizations may be completely decoupled, so a computer may solve the 2D coordinate layout optimization problem as two 1D optimizations.

The linear programming for the 1D optimization for the x coordinates has the form:

$$A_e x = b_e$$

$$Ax \geq b$$

$$\text{minimize } c^T x$$

where matrix $A_e$, matrix A, vector $c^T$ and vector $b_e$ are as described below.

The 1D optimization for the y coordinates has the same form, except that y is substituted for X.

For each $\delta_{ij}=\delta_C(i,j)$ that is well defined (recall that for many ij pairs, the offset computation procedure yields no result), there are two equality constraints and four greater-than-zero constraints. Rewriting with the variables on the left and the constants on the right $$g_i^x - g_j^x - \Delta_{ij}^{x+} + \Delta_{ij}^{x-} = \delta_{ij}^x$$

$$g_i^y - g_j^y - \Delta_{ij}^{y+} + \Delta_{ij}^{y-} = \delta_{ij}^y$$

with $\Delta_{ij}^{x+}, \Delta_{ij}^{x-}, \Delta_{ij}^{y+}, \Delta_{ij}^{y-}$ each equal to zero.

Also, for the $A_e$ matrix, set a global initial point from which to start placing the $g_i$ coordinates, which is completely arbitrary, but is specified to give the optimization problem a well-defined solution.

$$g_0^x = 0$$

$$g_0^y = 0$$

Actually, each equation described in the preceding two paragraphs has four terms on the left side, which are either: (a) $g_i^x, g_j^x, \Delta_{ij}^{x+}, \Delta_{ij}^{x-}$, or (b) $g_i^y, g_j^y, \Delta_{ij}^{y+}, \Delta_{ij}^{y-}$. In the preceding two paragraphs, the terms on the left side with the zero coefficients are not shown. The $A_e$ matrix has a row for each of the equations described in the preceding two paragraphs. Each row of the $A_e$ matrix consists of the 0, −1 or +1 coefficients of the terms on the left side of the corresponding equation. The number of rows in the $A_e$ matrix depends on the number of $\delta_{ij}=\delta_C(i,j)$ that are well defined. There are six rows in the $A_e$ matrix for each $\delta_{ij}$ that is well defined, plus two rows to set the global initial point. The vector $b_e$ is the column vector of the terms on the right side of the equations described in the preceding two paragraphs. The vector c is a column vector. For each $\delta_{ij}$ that is well defined, vector c includes four elements $[0\ 0\ 1\ 1]^T$. The number of elements in the vector c is equal to the number of coordinate variables plus two times the number of pair constraints. Each row of the matrix A contains a single 1 and otherwise zeroes and represents the constraints that $\Delta_{ij}^{x+}, \Delta_{ij}^{x-}, \Delta_{ij}^{y+}, \Delta_{ij}^{y-}$ are greater than or equal to zero. The vector b is a zero vector. The vector x is the variables that are being solved for.

Then, to solve the 1D optimization problem for the x coordinates in Step M2 using a linear programming approach, minimize $$\sum_i \sum_j \Delta_{ij}^{x+} + \Delta_{ij}^{x-} + \Delta_{ij}^{y+} + \Delta_{ij}^{y-}$$

The same approach may be used to solve the 1D optimization problem for the y coordinate in Step M2 using a linear programming approach, except that y is substituted for X.

Here is a non-limiting example of matrix $A_e$ and vector $b_e$: Assume that there are only two calibration images, and that the gaze points for these two calibration images are $d_1=(200,300)$ and $d_2=(400,500)$. In this example, there are only two calibration images and thus only one estimated offset $\delta_{12}$. Assume that $\delta_{12}=(60,70)$, meaning that $\delta_{12}^x=60$ and $\delta_{12}^y=70$. A goal is to compute $g(d_i)=(g_1^x,g_2^y)$. One can solve for the x variables and y variables separately. First, consider the x variable optimization. In this x variable optimization, compute $g_1^x$ and $g_2^x$. As described above, there will be auxiliary variables $\Delta_{12}^{x+}$ and $\Delta_{12}^{x-}$. In this example, the constraints for the x variable optimization are:

$$g_1^x - g_2^x - \Delta_{12}^{x+} + \Delta_{12}^{x-} = 60$$

$$g_1^x = 0$$

$$\Delta_{12}^{x+} \geq 0$$

$$\Delta_{12}^{x-} = 0$$

That is $$A_e = \begin{pmatrix} 1 & -1 & -1 & 1 \\ 1 & 0 & 0 & 0 \end{pmatrix}$$

$$x = \begin{pmatrix} g_1^x \\ g_2^x \\ \Delta_{12}^{x+} \\ \Delta_{12}^{x-} \end{pmatrix}$$

$$b_e = \begin{pmatrix} 60 \\ 0 \end{pmatrix}$$

$$A = \begin{pmatrix} 0 & 0 & 1 & 0 \\ 0 & 0 & 0 & 1 \end{pmatrix}$$

$$b = \begin{pmatrix} 0 \\ 0 \end{pmatrix}$$

$$c = \begin{pmatrix} 0 \\ 0 \\ 1 \\ 1 \end{pmatrix}$$

Fitting Ray-Traced Eye Model

Step U4 comprises fitting a five-parameter model of the eye to the set of training images (i.e., camera images captured during training) in $L(m_D)$. This fitting may be achieved by an algorithm that involves setting up a ray-tracing model (Step F1) and iteratively refining the fit (Step F2), as follows:

Step F1 (training): Set up a model of the system in ray-tracing software, which model includes a display screen (e.g. 701), an eye (e.g. 730 or 731), optics (e.g., lens 710 or 711) and a viewpoint from which to render.

Step F2 (training): Fit five eye parameters to the camera images in $L(m_D)$. The five eye parameters are (x,y) displacement of eye parallel to the display plane, distance d from eye to display, and the primary $r_p$ and secondary $r_s$ radii of the eye. The eye is modeled as a big sphere (the whole eye ball) and a small sphere (the cornea). The primary radius is the radius of the eye ball and the secondary radius is the radius of the cornea. Step F2 may comprise an iterative refinement method that comprises sub-steps (a), (b) and (c) below:

Sub-Step (a): Use ray-tracing to generate candidate camera images with an initial set of five eye parameters, programmatically rotating the eye to each of the training gaze points $d_i$.

(b) Compute an error metric by iteratively comparing the generated candidate images against the training set $L(m_D)$. The training set is fixed through the entire process. For any given set of candidate parameters, for each iteration: (i) use sub-step (a) to generate simulated camera images, and (ii) then compare each of those simulated camera images to the real camera images. Iteration-by-iteration, the simulated camera images get closer and closer to the corresponding images from the training set. At end of each iteration, feed results back into sub-step (a) for the next iteration. Stop the process when an error metric is below a certain threshold. For example, the error metric may be: (i) pixel-by-pixel comparison in color or gray-scale, or (ii) total distance between matched features.

This iterative refinement algorithm is highly parallelizable. For example, in order to perform the iterative refinement, a computer may employ parallel, brute force search methods, and standard methods such as Monte Carlo or simulated annealing may be used to make parallel computation more efficient.

Prototype & Prototype Results

The following nine paragraphs describe a prototype implementation of this invention. This prototype is a non-limiting example of this invention. The invention may be implemented in many other ways, and is not limited to this prototype.

In this prototype, a gaze-tracking system includes a Google® Cardboard-based HMD (head-mounted display) into which is inserted a Samsung® Galaxy Note 5 smartphone. The front-facing camera in the Note 5 smartphone captures images of a Purkinje image (reflecting from the user's eye) of the on-screen image that is displayed by the smartphone. The position of these reflections varies, depending on eye pose. Based on these camera images, the gaze-tracking system estimates the user's gaze direction.

In this prototype, the Google® Cardboard is modified with a (1) spacer that holds the Samsung® Galaxy Note 5 in the correct position; and (2) a mirror to reflect time-codes for synchronizing content and gaze.

This prototype comprises a low-cost device for eye-tracking in a HMD that employs a smartphone as a VR (virtual reality) display screen.

In this prototype, the system acquires pairs of images—one a screen capture of the display screen, and the other a frame captured by the camera. The API's (application programming interfaces) for the smartphone's camera do not ensure that a picture will be taken at a specified time with millisecond precision. For the Samsung® Galaxy Note 5, the time from the API call until the photo is taken is non-deterministic, and typically in the range of 200 to 300 ms. Another 200-300 ms then elapses before the frame is presented back to the prototype software, by Android™ OS. For video capture, this start-time problem is compounded by uneven frame durations. To estimate an unknown gaze position, the system may compare a camera image to a training image. Thus, it is desirable that the training images be correct—that the user is in fact looking at the desired point on screen at the time when the frame is captured. In this prototype, synchronization of the screen capture and camera frame is achieved. The method of synchronization varies, depending on whether the camera is acquiring images during training or during run-time.

In this prototype, during training data acquisition, the system acquires a set of training images by using a grid-based calibration. During training, a display screen displays one or more fixation targets that induce the eye to look at each point on a grid, while the system takes a picture of the eye. For example, the display screen may display a pulsating target that moves from one grid point to the next. The user is asked to trigger the camera to take a photo, by pressing a button. An advantage of doing so is that the user tends to know when the user's eye is looking at the fixation target. The button is located on a laptop keyboard, instead of on the Google® Cardboard device itself.

During runtime data acquisition, the camera may be operated in a frame-streaming or video mode. This prototype uses encoded video, which leverages the camera firmware to reliably timestamp the frames in the video. In addition, the display screen displays a visual timestamp (e.g., a visual display of a five digit number) and a mirror reflects this visual timestamp directly to the camera. The mirror (e.g., 714) may be located adjacent to a lens in the optics (e.g., 710). In this prototype, the visual timestamp is not limited to a visual timestamp, but may comprise a variety of machine-readable codes or human-readable codes In this prototype, the encoded video uses two kinds of time codings: frame start times and frame durations. Camera frame start times are sometimes non-monotonic. However, the frame durations of the camera images are reliable, so the prototype may accumulate the frame durations to generate correct time stamps. In this prototype, the time code at the beginning of a video may be used to calibrate the offset between display time and capture time for the entire video.

An experiment was conducted to test how accurately this prototype performs discrete gaze tracking. In this experiment, the range of possible outputs (estimated gaze points) were limited to gaze points used during training. For each participant, three data sets per grid size (coarse 3×4, fine 4×7) were measured: the first data set was used as the training set and the other two data sets were used as experimental trials. For each data set, the user looked sequentially at each of the gaze points in a grid (12 gaze points in the coarse grid and 28 gaze points in the fine grid). Table 1 below summarizes the classification accuracy for the coarse grid (the grid of 3×4 gaze points) versus the fine grid (the grid of 4×7 gaze points). In Table 1, the "classification accuracy" means the percentage of the run-time gaze points that the prototype gaze-tracking system correctly classified.

TABLE 1

| Participant | Coarse Grid Classification Accuracy | Fine Grid Classification Accuracy |
| --- | --- | --- |
| 1 | 100.00 | 71.43 |
|   | 100.00 | 35.71 |
| 2 | 91.67 | 92.86 |
|   | 83.33 | 89.29 |
| 3 | 66.67 | 60.71 |
|   | 58.33 | 32.14 |
| 4 | 83.33 | 96.43 |
|   | 83.33 | 92.86 |
| 5 | 91.67 | 82.14 |
|   | 83.33 | 32.14 |
| 6 | 91.67 | 50.00 |
|   | 100.00 | 85.71 |
| Average | 86.11 | 68.45 |

A second experiment was conducted to test how accurately this prototype performs continuous gaze tracking (as defined herein). In this second experiment, for each participant, three data sets per participant were measured: the first data set was used as the training set and the other two data sets were used as experimental trials. For each data set, the user looked sequentially at a set of gaze points similar to that shown in FIG. 6. Table 2 below summarizes the error in estimated gaze that was measured for so-called "continuous" gaze tracking by this prototype. In Table 2, the error is expressed in pixels—that is, a 1D distance (expressed in pixels) between the actual gaze point and the estimated gaze point. As shown in Table 2, the average error was 70.48 pixels, which—for this particular prototype—corresponds to approximately 5 degrees in the field of view

TABLE 2

| Participant | Error (screen pixels) |
| --- | --- |
| 1 | 43.04745808 |
|   | 92.02007143 |
| 2 | 55.913787 |
|   | 59.95227937 |
| 3 | 71.25138298 |
|   | 35.22293069 |
| 4 | 125.238357 |
|   | 81.24834567 |
| Average | 70.48 |

Alternatives

In some implementations of this invention, the gaze tracking is performed while the user looks at a display in the environment (e.g., a computer monitor screen, projection screen, or smartphone display screen) that is not part of a VR/AR display.

In some implementations of this invention, features may be represented individually using a computer vision-based feature extraction method. Alternatively, or in addition, a computer may perform a full image comparison technique. A full image comparison algorithm may be advantageous depending on the computational hardware. For example, parallel GPU-based hardware may do a brute-force comparison of all pixels, while sequential CPU-based computation may be better suited for a feature-extraction algorithm.

In some implementations of this invention, the display screen that displays the display images is planar (e.g., a flat LCD display). However, this invention is not limited to a flat display. The display surface may be either curved or planar. If the display surface is curved (non-planar), then all references herein to a display plane may instead refer to the display surface, which may be of any shape.

In illustrative implementations of this invention, a computer estimates the gaze point for a camera image. However, this invention is not limited to calculating gaze points. Alternatively, a computer may estimate a direction of gaze instead of, or in addition to, a gaze point. For example, the calculated direction of gaze may be described by a combination of one or more angles, one or more points at which a visual or optical axis of an eye originates or ends, and one or more points at which a visual or optical axis of the eye intersects a geometric plane or other geometric surface.

Prototype: Source Code

In the Computer Program Listing above, two computer program files are listed. These two computer program files comprise software employed in a prototype implementation of this invention. To run these as Matlab™ software files, the filename extension for each would be changed from ".txt" to ".m". Here is a description of these two computer program files:

(1) layoutFunctions.txt: The layoutFunctions program performs a variety of algorithms, including separating calculations into 1D computations, solving for a 1D layout, and assembling the $A_e$ matrix.

Within the layoutFunctions program, the gridLP_2d function breaks up the 2D layout problem into two 1D layout problems, solves them independently, and puts the results together.

Within the layoutFunctions program, the gridLP_1d function solves for a 1D layout (e.g. x or y, which are also referred to as "j" and "I" respectively). It also assembles the $A_e$ matrix from blocks. These create the right patterns of 0, 1, −1 to represent the equations.

(2) makefunctionsNew.txt: The makefunctionsNew program performs a variety of algorithms, including computing offsets between images and computing a discrete mapping.

Within the makefunctionsNew program, the getTranslation function calculates an offset between two camera images. The computations performed by the getTranslation function include: (a) Return a data structure containing possible matching SURF features in the two images. (b) Reformat data to obtain the x,y coordinates of the potential/tentative matches in each image. They are ordered to correspond to each other: the first x,y point in "points1" tentatively matches the first x,y point in "points2", and so on. (c) Compute a reduced set of matching features that are all consistent with a geometric mapping of an expected type (e.g., affine or projective) with a small number of parameters (e.g., projective mapping with nine parameters). (d) Compute the average translation between matching points in picOne vs picTwo. These values are very close together, but not identical. Averaging gives a single value that is reasonable.

Within the makefunctionsNew program, the generateLayout function extracts and reformats information for the layout computation. Estimated offsets of calibration points in G(C) are pre-computed, along with the number of inliers associated with each. The estimates that have a number of inliers smaller than a threshold are discarded later.

This invention is not limited to the software set forth in these two computer program files. Other software may be employed. Depending on the particular implementation, the software used in this invention may vary.

Computers

In exemplary implementations of this invention, one or more electronic computers (e.g., servers, network hosts, client computers, integrated circuits, microcontroller, controllers, field-programmable-gate arrays, personal computers, or other onboard or remote computers) are programmed and specially adapted: (1) to control the operation of, or interface with, hardware components of a gaze tracking system, including one or more cameras and one or more display screens; (2) to control timing of camera exposures of one or more cameras and to read out data captured by the one or more cameras; (3) to control timing and content of (or to capture content of) display images displayed by one or more display surfaces, such as one or more display screens; (4) to calculate a mapping that maps from a display image and its gaze point to a camera image; (5) to calculate an inverse, continuous mapping that maps from a camera image to a display gaze point; (6) to transform coordinates of camera gaze points of training images into coordinates in a global camera-space coordinate system, which global system minimizes the sum of normalized pairwise geometric offsets between camera gaze points for training images; (7) to perform a discrete classification that compares features in a run-time camera image to features in training images, determines which training image most closely matches the run-time camera image, and estimates that the display gaze point for the run-time camera image is the same as the display gaze point for the closest matching training image; (8) to perform so-called continuous gaze tracking for an eye that is looking at a calibrated image, or that is looking at a new image; (9) to calculate pairwise geometric offsets; (10) to normalize pairwise geometric offsets; (11) to perform any other calculation, computation, program, algorithm, or computer function described or implied above; (12) to receive signals indicative of human input; (13) to output signals for controlling transducers for outputting information in human perceivable format; and (14) to process data, to perform computations, to execute any algorithm or software, and to control the read or write of data to and from memory devices (items 1-14 of this sentence referred to herein as the "Computer Tasks"). The one or more computers (e.g. 720, 805) may be in any position or positions within or outside of the gaze-tracking system. For example, in some cases (a) at least one computer is housed in or together with other components of the gaze-tracking system, such as a camera, and (b) at least one computer is remote from other components of the system. The one or more computers may communicate with each other or with other components of the gaze-tracking system either: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied above. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium comprises a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied above. For example, in some cases, instructions encoded in a tangible, non-transitory, computer-accessible medium comprise instructions for a computer to perform the Computer Tasks.

Network Communication

In illustrative implementations of this invention, an electronic device (e.g., any of devices 701-705, 720-726, 801, 802, 804, 805) is configured for wireless or wired communication with other electronic devices in a network.

For example, in some cases, one or more of the electronic devices includes a wireless communication module for wireless communication with other electronic devices in a network. Each wireless communication module may include (a) one or more antennas, (b) one or more wireless transceivers, transmitters or receivers, and (c) signal processing circuitry. The wireless communication module receives and transmits data in accordance with one or more wireless standards.

In some cases, one or more of the following hardware components are used for network communication: a computer bus, a computer port, network connection, network interface device, host adapter, wireless module, wireless card, signal processor, modem, router, computer port, cables or wiring.

In some cases, one or more computers (e.g., 720, 805) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTS (long term evolution)), or other IEEE communication standard.

Definitions

The terms "a" and "an", when modifying a noun, do not imply that only one of the noun exists.

To say that a simulated image "appears" to be X means that the simulated image comprises data that would appear, if rendered in a format visible to a human eye, to be X. To say that a simulated image "appears" to be X does not require that the simulated image actually be viewed by a human or be rendered in a format visible to a human.

To compute "based on" specified data means to perform a computation that takes the specified data as an input.

Here are some non-limiting examples of a "camera": (a) a digital camera; (b) a digital grayscale camera; (c) a digital color camera; (d) a video camera; (e) a light sensor or image sensor, (f) a set or array of light sensors or image sensors; (g) an imaging system; (h) a light field camera or plenoptic camera; (i) a time-of-flight camera; and (j) a depth camera.

"Camera gaze point" is defined in the Summary above.

"Camera image" is defined in the Summary, above.

To say that a camera "captures" X means that the camera records X. To say that a camera image "captures" X means that the camera image comprises a recording of X. To "screen capture" means to copy data that encodes an image displayed on a screen, which copying does not involve recording light incident on a camera sensor.

The term "comprise" (and grammatical variations thereof) shall be construed as if followed by "without limitation". If A comprises B, then A includes B and may include other things.

The term "computer" includes any computational device that performs logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer so that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Continuous" mapping is defined above.

"Continuous gaze tracking" is defined above.

"Defined Term" means a term or phrase that is set forth in quotation marks in this Definitions section.

To say that a display screen "displays" a display image during a time period does not imply that the display image is completely static throughout the entire period. A non-limiting example is that the position, shape or color of a fixation target in a display image may change (such as by pulsating) during a time period, while the display screen displays the display image.

"Display gaze point" is defined in the Summary above.

A display gaze point "for" a camera image is defined in the Summary above.

"Display image" is defined in the Summary above.

"Display pixel" means a pixel of a display surface.

"Display surface" means a surface that displays an image that is generated by one or more active light sources. Non-limiting examples of a "display surface" include an electronic display screen (e.g., of a smartphone or tablet computer), a touch display screen, a computer monitor screen, and a projection surface onto which a digital projector projects an image.

"Domain" means a domain of a function, i.e., the set of input values for which the function is defined.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"Fixation target" means a visual feature that tends to induce a user to fix the user's gaze on the feature.

"For instance" means for example.

The term "frame" shall be construed broadly. For example, the term "frame" includes measured data about a scene that is captured by a camera during a single time period or single exposure, even if (i) the data is not humanly perceptible, (ii) the data has not been computationally processed, and (iii) there is not a one-to-one mapping between the data and the scene being imaged.

In the context of a camera (or components of the camera), "front" is optically closer to the scene being imaged, and "rear" is optically farther from the scene, during normal operation of the camera. In the context of a display device (or components of the display device), "front" is optically closer to a human viewer, and "rear" is optically farther from the viewer, when the viewer is viewing a display produced by the device during normal operation of the device. The "front" and "rear" of a display device continue to be the front and rear, even when no viewer is present.

"Gaze point" is defined in the Summary above.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

"Image pair" is defined in the Summary above.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

Here is non-limiting example of two "matching features". In this example, a single display pixel in a display screen is brightly illuminated and the rest of the display pixels in the display screen are completely dark. Two camera images of the display screen are captured, such that the camera's orientation relative to the display screen is different for the first camera image than for the second camera image. Each of these two camera images captures an image of the display screen that is completely dark, except for a bright point in the camera image that corresponds to the brightly lit display pixel. In this non-limiting example, these bright points—in the first and second camera images, respectively—are "matching features" that match each other.

In the context of a system that includes a camera, an "on-axis" light source means a light source positioned such that the light source and the optical axis of the camera appear (from a vantage point in the cornea of an eye) to be separated by no more than two degrees.

"1D" means one-dimensional.

The term "or" is inclusive, not exclusive. For example, A or B is true if A is true, or B is true, or both A or B are true. Also, for example, a calculation of A or B means a calculation of A, or a calculation of B, or a calculation of A and B.

"Pairwise geometric offset" means a geometric offset between a pair of matching features, which pair of matching features consists of a feature in a first image and a matching feature in a second image.

A parenthesis is simply to make text easier to read, by indicating a grouping of words. A parenthesis does not mean that the parenthetical material is optional or may be ignored.

"Range" means the image (in the mathematical sense) of a function; that is, the set of output values of the function.

As used herein, the term "set" does not include a group with no elements. Mentioning a first set and a second set does not, in and of itself, create any implication regarding whether or not the first and second sets overlap (that is, intersect).

To say that X occurs "shortly before" Y means that X occurs before Y, but not more than one second before Y.

"Simulated image" means data that is produced by computer simulation and that encodes an image.

"Some" means one or more.

"Such as" means for example.

"Training image" is defined in the Summary above.

"Training gaze point" is defined in the Summary above.

To say that a machine-readable medium is "transitory" means that the medium is a transitory signal, such as an electromagnetic wave.

"2D" means two-dimensional.

"Visible light image" means a camera image that is a recording of data regarding light incident on a sensor of a camera, which light has a wavelength that is greater than or equal to 390 nm and less than or equal to 700 nm.

A matrix may be indicated by a bold capital letter (e.g., D). A vector may be indicated by a bold lower case letter (e.g., U). However, the absence of these indicators does not indicate that something is not a matrix or not a vector.

Except to the extent that the context clearly requires otherwise, if steps in a method are described herein, then the method includes variations in which: (1) steps in the method occur in any order or sequence, including any order or sequence different than that described; (2) any step or steps in the method occurs more than once; (3) any two steps may occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; or (7) the method includes other steps, in addition to the steps described.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, and possessive forms, and different declensions, and different tenses.

To the extent that a definition appears in a given claim, then that definition applies only to the given claim and to any claims that are dependent on that given claim.

For purposes hereof: (a) a defined term (that is explicitly defined herein) is merely a symbol that means (i.e., signifies) the item being defined; and (b) the words in the defined term itself create no implication. For example, if "pink dinosaur" is defined herein to mean bazooka, then: (a) the defined term "pink dinosaur" would merely be an arbitrary symbol that means bazooka; (b) the words inside the arbitrary symbol (i.e., "pink dinosaur") would create no implication, regardless of their meaning; and (c) "pink dinosaur" would not imply that the bazooka is pink and would not imply that the bazooka is a dinosaur.

Variations

This invention may be implemented in many different ways. Here are some non-limiting examples:

In some implementations, this invention is a method comprising: (a) a display screen displaying a display image during a first period; (b) a camera capturing camera images ("training images") during the first period, such that each respective training image captures the display image reflecting from a cornea of a user's eye while the eye looks at a gaze point, which gaze point is different than that for any other training image; (c) one or more computers calculating, based on the training images and on the gaze points for the training images, a continuous mapping; (d) the display screen displaying the display image during a second period, which second period starts after the end of the first period; (e) the camera capturing, during the second period, a camera image (the "run-time camera image") that captures the display image reflecting from the cornea while the eye is looking at a specific gaze point, and (f) the one or more computers (i) calculating a set of geometric offsets for a group of image pairs, such that (A) each image pair in the group consists of the run-time camera image and a training image, (B) the group consists of image pairs that, collectively, include all of the training images, and (C) for any given image pair in the group, which given image pair consists of the run-time image and a given training image, each geometric offset is between (1) a visual feature in the run-time image and (2) a matching visual feature in the given training image, and (ii) calculating, based on the set of geometric offsets and on the continuous mapping, a first estimate of position of the specific gaze point. In some cases, the one or more computers calculate a second estimate of position of the specific gaze point for the run-time camera image, by: (a) comparing the run-time camera image to the training images, in order to determine which training image (the "closest training image") most closely matches the run-time camera image; and (b) estimating that the specific gaze point for the run-time camera image is the same as the gaze point for the closest training image. In some cases: (a) the method does not include an on-axis light source illuminating the cornea; and (b) the training images and run-time camera image are visible light images. In some cases, the display screen displays the display image such that a fixation target in the display image changes appearance or position during at least the first period. In some cases, the gaze point, for each respective training image, is located at a display pixel that displays a fixation target at, or shortly before, the time at which the camera begins to capture the respective training image. Each of the cases described above in this paragraph is an example of the method described in the first sentence of this paragraph, and is also an example of an embodiment of this invention that may be combined with other embodiments of this invention.

In some implementations, this invention is a method comprising: (a) a display screen displaying a first display image (the "training display image") during a first period; (b) a camera capturing camera images ("training camera images") during the first period, such that each respective training camera image captures the display image reflecting from a cornea of a user's eye while the eye looks at a gaze point, which gaze point is different than that for any other training camera image; (c) one or more computers calculating, based on the training camera images and on the gaze points for the training camera images, a continuous mapping; (d) the display screen displaying a second display image (the "run-time display image") during a second period, which second period starts after the end of the first period; (e) the camera capturing, during the second period, a camera image (the "run-time camera image") that captures the second display image reflecting from the cornea while the eye is looking at a specific gaze point, and (f) the one or more computers (i) calculating, based on the run-time display image and on an eye model that has been fitted to the training camera images, simulated camera images such that each respective simulated image (A) appears to capture the run-time display image reflecting from a cornea of a user's eye, and (B) appears to be captured by the camera while the eye is looking at a particular gaze point, which particular gaze point is a gaze point for a training camera image and is different than the gaze point for any other simulated image, (ii) calculating a set of geometric offsets for a group of image pairs, such that (A) each image pair in the group consists of the run-time camera image and a simulated image, (B) the group consists of image pairs that, collectively, include all of the simulated images, and (C) for any given image pair in the group, which given image pair consists of the run-time image and a given simulated image, each geometric offset is between (i) a visual feature in the run-time image and (ii) a matching visual feature in the given simulated image, and (iii) calculating, based on the set of geometric offsets and on the continuous mapping, an estimate of position of the specific gaze point. In some cases, the method does not include the camera capturing a camera image of a retro-reflection from the cornea. In some cases, the training images and additional image are visible light images. In some cases, the display screen displays the first display image such that a fixation target in the first display image changes appearance or position during at least the first period. In some cases, the method does not include identifying a centroid of a pupil and does not include identifying an edge of a pupil or of an iris. Each of the cases described above in this paragraph is an example of the method described in the first sentence of this paragraph, and is also an example of an embodiment of this invention that may be combined with other embodiments of this invention.

In some implementations, this invention is a system comprising: (a) a display screen for displaying a display image during a first period and during a second period, which second period starts after the end of the first period; (b) a camera for (i) capturing camera images ("training images") during the first period, such that each respective training image captures the display image reflecting from a cornea of a user's eye while the eye looks at a gaze point, which gaze point is different than that for any other training image, and (ii) capturing, during the second period, a camera image (the "run-time camera image") that captures the display image reflecting from the cornea while the eye is looking at a specific gaze point; and (c) one or more computers that are programmed (i) to calculate, based on the training images and on the gaze points for the training images, a continuous mapping, (ii) to calculate a set of geometric offsets for a group of image pairs, such that (A) each image pair in the group consists of the run-time camera image and a training image, (B) the group consists of image pairs that, collectively, include all of the training images, and (C) for any given image pair in the group, which given image pair consists of the run-time image and a given training image, each geometric offset is between (1) a visual feature in the run-time image and (2) a matching visual feature in the given training image, and (iii) to calculate, based on the set of geometric offsets and on the continuous mapping, a first estimate of position of the specific gaze point. In some cases, the one or more computers are programmed to calculate a second estimate of position of the specific gaze point for the run-time camera image, by: (a) comparing the run-time camera image to the training images, in order to determine which training image (the "closest training image") most closely matches the run-time camera image; and (b) estimating that the specific gaze point for the run-time camera image is the same as the gaze point for the closest training image. In some cases, the training images and run-time camera image are visible light images.

In some cases, the one or more computers are programmed to cause the display screen to display the display image, such that a fixation target in the display image changes appearance or position during at least the first period. In some cases, the gaze point, for each respective training image, is located at a display pixel that displays a fixation target at, or shortly before, the time at which the camera begins to capture the respective training image. Each of the cases described above in this paragraph is an example of the system described in the first sentence of this paragraph, and is also an example of an embodiment of this invention that may be combined with other embodiments of this invention.

In some implementations, this invention is a system comprising: (a) a display screen for displaying a display image during a first period and during a second period, which second period starts after the end of the first period; (b) a camera for (i) capturing camera images ("training images") during the first period, such that each respective training image captures the display image reflecting from a cornea of a user's eye while the eye looks at a gaze point, which gaze point is different than that for any other training image, and (ii) capturing, during the second period, a camera image (the "run-time camera image") that captures the display image reflecting from the cornea while the eye is looking at a specific gaze point; and (c) one or more computers that are programmed (i) to calculate, based on the training images and on the gaze points for the training images, a continuous mapping, (ii) to calculate, based on the run-time display image and on an eye model that has been fitted to the training camera images, simulated camera images such that each respective simulated image (A) appears to capture the run-time display image reflecting from a cornea of a user's eye, and (B) appears to be captured by the camera while the eye is looking at a particular gaze point, which particular gaze point is a gaze point for a training camera image and is different than the gaze point for any other simulated image; (iii) to calculate a set of geometric offsets for a group of image pairs, such that (A) each image pair in the group consists of the run-time camera image and a simulated image, (B) the group consists of image pairs that, collectively, include all of the simulated images, and (C) for any given image pair in the group, which given image pair consists of the run-time image and a given simulated image, each geometric offset is between (i) a visual feature in the run-time image and (ii) a matching visual feature in the given simulated image, and (iv) to calculate, based on the set of geometric offsets and on the continuous mapping, an estimate of position of the specific gaze point. In some cases, the one or more computers are not programmed to detect a retro-reflection in a training camera image. In some cases, the camera is configured to capture visible light images. In some cases, the one or more computers are programmed to cause the display screen to display the training display image such that a fixation target in the training display image changes appearance or position during at least the first period. In some cases, the one or more computers: (a) are not programmed to identify a centroid of a pupil; (b) are not programmed to identify a periphery of a pupil; and (c) are not programmed to identify a periphery of an iris. Each of the cases described above in this paragraph is an example of the system described in the first sentence of this paragraph, and is also an example of an embodiment of this invention that may be combined with other embodiments of this invention.

In some implementations, this invention is a system comprising: (a) a display screen; (b) a camera; and (c) one or more computers that are programmed (i) to control the display screen, such that the display screen displays a display image during a first period, (ii) to control the camera, such that the camera captures camera images ("training images") during the first period, such that each respective training image captures the display image reflecting from a cornea of a user's eye while the eye looks at a gaze point, which gaze point is different than that for any other training image, (iii) to calculate, based on the training images and on the gaze points for the training images, a continuous mapping, (iv) to control the display screen, such that the display screen displays the display image during a second period, which second period starts after the end of the first period, (v) to control the camera, such that the camera captures, during the second period, a camera image (the "run-time camera image") that captures the display image reflecting from the cornea while the eye is looking at a specific gaze point, (vi) to calculate a set of geometric offsets for a group of image pairs, such that (A) each image pair in the group consists of the run-time camera image and a training image, (B) the group consists of image pairs that, collectively, include all of the training images, and (C) for any given image pair in the group, which given image pair consists of the run-time image and a given training image, each geometric offset is between (I) a visual feature in the run-time image and (II) a matching visual feature in the given training image, and (vii) to calculate, based on the set of geometric offsets and on the continuous mapping, a first estimate of position of the specific gaze point. In some cases, the one or more computers are programmed to calculate a second estimate of position of the specific gaze point for the run-time camera image: by (a) comparing the run-time camera image to the training images, in order to determine which training image (the "closest training image") most closely matches the run-time camera image; and (b) estimating that the specific gaze point for the run-time camera image is the same as the gaze point for the closest training image. In some cases, the training images and run-time camera image are visible light images. In some cases, the one or more computers are programmed to cause the display screen to display the display image, such that a fixation target in the display image changes appearance or position during at least the first period. In some cases, the gaze point, for each respective training image, is located at a display pixel that displays a fixation target at, or shortly before, the time at which the camera begins to capture the respective training image. Each of the cases described above in this paragraph is an example of the system described in the first sentence of this paragraph, and is also an example of an embodiment of this invention that may be combined with other embodiments of this invention.

In some implementations, this invention is a system comprising: (a) a display screen; (b) a camera; and (c) one or more computers that are programmed (i) to control the display screen, such that the display screen displays a display image (the "training display image") during a first period, (ii) to control the camera, such that the camera captures camera images ("training camera images") during the first period, such that each respective training camera image captures the display image reflecting from a cornea of a user's eye while the eye looks at a gaze point, which gaze point is different than that for any other training camera image and is located at a known position in the display screen, (iii) to calculate, based on the training camera images and on the gaze points for the training camera images, a continuous mapping, (iv) to control the display screen, such that the display screen displays a second display image (the "run-time display image") during a second period, which second period starts after the end of the first period, (v) to control the camera, such that the camera captures, during the second period, a camera image (the "run-time camera image") that captures the second display image reflecting from the cornea while the eye is looking at a specific gaze point, (vi) to calculate, based on the run-time display image and on an eye model that has been fitted to the training camera images, simulated camera images such that each respective simulated image (A) appears to capture the run-time display image reflecting from a cornea of a user's eye, and (B) appears to be captured by the camera while the eye is looking at a particular gaze point, which particular gaze point is a gaze point for a training camera image and is different than the gaze point for any other simulated image, (vii) to calculate a set of geometric offsets for a group of image pairs, such that (A) each image pair in the group consists of the run-time camera image and a simulated image, (B) the group consists of image pairs that, collectively, include all of the simulated images, and (C) for any given image pair in the group, which given image pair consists of the run-time image and a given simulated image, each geometric offset is between (i) a visual feature in the run-time image and (ii) a matching visual feature in the given simulated image, and (viii) to calculate, based on the set of geometric offsets and on the continuous mapping, an estimate of position of the specific gaze point. In some cases, the one or more computers are not programmed to detect a retro-reflection in a training camera image. In some cases, the camera is configured to capture visible light images. In some cases, the one or more computers are programmed to cause the display screen to display the training display image such that a fixation target in the training display image changes appearance or position during at least the first period. In some cases, the one or more computers: (a) are not programmed to identify a centroid of a pupil; (b) are not programmed to identify a periphery of a pupil; and (c) are not programmed to identify a periphery of an iris. Each of the cases described above in this paragraph is an example of the system described in the first sentence of this paragraph, and is also an example of an embodiment of this invention that may be combined with other embodiments of this invention.

The above description (including without limitation any attached drawings and figures) describes illustrative implementations of the invention. However, the invention may be implemented in other ways. The methods and apparatus which are described above are merely illustrative applications of the principles of the invention. Other arrangements, methods, modifications, and substitutions by one of ordinary skill in the art are therefore also within the scope of the present invention. Numerous modifications may be made by those skilled in the art without departing from the scope of the invention. Also, this invention includes without limitation each combination and permutation of one or more of the above-mentioned implementations, embodiments and features.

The invention claimed is:

1. A method comprising:
   (a) a display screen displaying a display image during a first period;
   (b) a camera capturing camera images ("training images") during the first period, such that each respective training image captures the display image reflecting from a cornea of a user's eye while the eye looks at a gaze point, which gaze point is different than that for any other training image;
   (c) one or more computers calculating, based on the training images and on the gaze points for the training images, a continuous mapping;
   (d) the display screen displaying the display image during a second period, which second period starts after the end of the first period;
   (e) the camera capturing, during the second period, a camera image (the "run-time camera image") that captures the display image reflecting from the cornea while the eye is looking at a specific gaze point, and
   (f) the one or more computers
      (i) calculating a set of geometric offsets for a group of image pairs, such that
         (A) each image pair in the group consists of the run-time camera image and a training image,
         (B) the group consists of image pairs that, collectively, include all of the training images, and
         (C) for any given image pair in the group, which given image pair consists of the run-time image and a given training image, each geometric offset is between (1) a visual feature in the run-time image and (2) a matching visual feature in the given training image, and
      (ii) calculating, based on the set of geometric offsets and on the continuous mapping, a first estimate of position of the specific gaze point.

2. The method of claim 1, wherein the one or more computers calculate a second estimate of position of the specific gaze point for the run-time camera image, by:
   (a) comparing the run-time camera image to the training images, in order to determine which training image (the "closest training image") most closely matches the run-time camera image; and
   (b) estimating that the specific gaze point for the run-time camera image is the same as the gaze point for the closest training image.

3. The method of claim 1, wherein:
   (a) the method does not include an on-axis light source illuminating the cornea; and
   (b) the training images and run-time camera image are visible light images.

4. The method of claim 1, wherein the display screen displays the display image such that a fixation target in the display image changes appearance or position during at least the first period.

5. The method of claim 1, wherein the gaze point, for each respective training image, is located at a display pixel that displays a fixation target at, or shortly before, the time at which the camera begins to capture the respective training image.

6. The method of claim 1, wherein the one or more computers are programmed to cause the display screen to display the display image, such that a fixation target in the display image changes appearance or position during at least the first period.

7. The system of claim 1, wherein the gaze point, for each respective training image, is located at a display pixel that displays a fixation target at, or shortly before, the time at which the camera begins to capture the respective training image.

8. A method comprising:
   (a) a display screen displaying a first display image (the "training display image") during a first period;
   (b) a camera capturing camera images ("training camera images") during the first period, such that each respective training camera image captures the display image reflecting from a cornea of a user's eye while the eye looks at a gaze point, which gaze point is different than that for any other training camera image;
(c) one or more computers calculating, based on the training camera images and on the gaze points for the training camera images, a continuous mapping;
(d) the display screen displaying a second display image (the "run-time display image") during a second period, which second period starts after the end of the first period;
(e) the camera capturing, during the second period, a camera image (the "run-time camera image") that captures the second display image reflecting from the cornea while the eye is looking at a specific gaze point, and
(f) the one or more computers
  (i) calculating, based on the run-time display image and on an eye model that has been fitted to the training camera images, simulated camera images such that each respective simulated image
    (A) appears to capture the run-time display image reflecting from a cornea of a user's eye, and
    (B) appears to be captured by the camera while the eye is looking at a particular gaze point, which particular gaze point is a gaze point for a training camera image and is different than the gaze point for any other simulated image,
  (ii) calculating a set of geometric offsets for a group of image pairs, such that
    (A) each image pair in the group consists of the run-time camera image and a simulated image,
    (B) the group consists of image pairs that, collectively, include all of the simulated images, and
    (C) for any given image pair in the group, which given image pair consists of the run-time image and a given simulated image, each geometric offset is between (i) a visual feature in the run-time image and (ii) a matching visual feature in the given simulated image, and
  (iii) calculating, based on the set of geometric offsets and on the continuous mapping, an estimate of position of the specific gaze point.

9. The method of claim 8, wherein the method does not include the camera capturing a camera image of a retro-reflection from the cornea.

10. The method of claim 8, wherein the training images and additional image are visible light images.

11. The method of claim 8, wherein the display screen displays the first display image such that a fixation target in the first display image changes appearance or position during at least the first period.

12. The method of claim 8, wherein the method does not include identifying a centroid of a pupil and does not include identifying an edge of a pupil or of an iris.

13. A system comprising:
(a) a display screen for displaying a display image during a first period and during a second period, which second period starts after the end of the first period;
(b) a camera for
  (i) capturing camera images ("training images") during the first period, such that each respective training image captures the display image reflecting from a cornea of a user's eye while the eye looks at a gaze point, which gaze point is different than that for any other training image, and
  (ii) capturing, during the second period, a camera image (the "run-time camera image") that captures the display image reflecting from the cornea while the eye is looking at a specific gaze point; and
(c) one or more computers that are programmed
  (i) to calculate, based on the training images and on the gaze points for the training images, a continuous mapping,
  (ii) to calculate a set of geometric offsets for a group of image pairs, such that
    (A) each image pair in the group consists of the run-time camera image and a training image,
    (B) the group consists of image pairs that, collectively, include all of the training images, and
    (C) for any given image pair in the group, which given image pair consists of the run-time image and a given training image, each geometric offset is between (1) a visual feature in the run-time image and (2) a matching visual feature in the given training image, and
  (iii) to calculate, based on the set of geometric offsets and on the continuous mapping, a first estimate of position of the specific gaze point.

14. The system of claim 13, wherein the one or more computers are programmed to calculate a second estimate of position of the specific gaze point for the run-time camera image, by:
(a) comparing the run-time camera image to the training images, in order to determine which training image (the "closest training image") most closely matches the run-time camera image; and
(b) estimating that the specific gaze point for the run-time camera image is the same as the gaze point for the closest training image.

15. The system of claim 13, wherein the training images and run-time camera image are visible light images.

16. A system comprising:
(a) a display screen for displaying a display image during a first period and during a second period, which second period starts after the end of the first period;
(b) a camera for
  (i) capturing camera images ("training images") during the first period, such that each respective training image captures the display image reflecting from a cornea of a user's eye while the eye looks at a gaze point, which gaze point is different than that for any other training image, and
  (ii) capturing, during the second period, a camera image (the "run-time camera image") that captures the display image reflecting from the cornea while the eye is looking at a specific gaze point; and
(c) one or more computers that are programmed
  (i) to calculate, based on the training images and on the gaze points for the training images, a continuous mapping,
  (ii) to calculate, based on the run-time display image and on an eye model that has been fitted to the training camera images, simulated camera images such that each respective simulated image
    (A) appears to capture the run-time display image reflecting from a cornea of a user's eye, and
    (B) appears to be captured by the camera while the eye is looking at a particular gaze point, which particular gaze point is a gaze point for a training camera image and is different than the gaze point for any other simulated image,
  (iii) to calculate a set of geometric offsets for a group of image pairs, such that (A) each image pair in the group consists of the run-time camera image and a simulated image, (B) the group consists of image pairs that, collectively, include all of the simulated images, and (C) for any given image pair in the group, which given image pair consists of the run-time image and a given simulated image, each geometric offset is between (i) a visual feature in the run-time image and (ii) a matching visual feature in the given simulated image, and (iv) to calculate, based on the set of geometric offsets and on the continuous mapping, an estimate of position of the specific gaze point.

17. The system of claim 16, wherein the one or more computers are not programmed to detect a retro-reflection in a training camera image.

18. The system of claim 16, wherein the camera is configured to capture visible light images.

19. The system of claim 16, wherein the one or more computers are programmed to cause the display screen to display the training display image such that a fixation target in the training display image changes appearance or position during at least the first period.

20. The system of claim 16, wherein the one or more computers:
 (a) are not programmed to identify a centroid of a pupil;
 (b) are not programmed to identify a periphery of a pupil; and
 (c) are not programmed to identify a periphery of an iris.

* * * * *